(12) United States Patent
Yu et al.

(10) Patent No.: US 10,945,233 B2
(45) Date of Patent: Mar. 9, 2021

(54) PAGING METHOD, DEVICE, AND SYSTEM

(71) Applicant: HUAWEI TECHNOLOGIES CO., LTD., Guangdong (CN)

(72) Inventors: Youyang Yu, Shanghai (CN); Huan Li, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/919,974

(22) Filed: Mar. 13, 2018

(65) Prior Publication Data

US 2018/0206207 A1 Jul. 19, 2018

Related U.S. Application Data

(63) Continuation of application No. PCT/CN2015/089515, filed on Sep. 14, 2015.

(51) Int. Cl.
*H04W 68/02* (2009.01)
*H04W 88/06* (2009.01)
*H04W 68/12* (2009.01)
*H04W 8/08* (2009.01)
*H04W 68/04* (2009.01)
*H04W 88/16* (2009.01)

(52) U.S. Cl.
CPC ............ *H04W 68/02* (2013.01); *H04W 8/08* (2013.01); *H04W 68/04* (2013.01); *H04W 68/12* (2013.01); *H04W 88/06* (2013.01); *H04W 88/16* (2013.01)

(58) Field of Classification Search
None
See application file for complete search history.

(56) References Cited

U.S. PATENT DOCUMENTS 9,713,040 B2 * 7/2017 Cheng ............... H04W 36/0033
2009/0176513 A1 7/2009 Bosch et al.
(Continued)

FOREIGN PATENT DOCUMENTS

CN 101001449 A 7/2007
CN 101330704 A 12/2008
(Continued)

OTHER PUBLICATIONS

International Search Report issued in International Application No. PCT/CN2015/089515 dated May 30, 2016, 17 pages.
(Continued)

*Primary Examiner* — German Viana Di Prisco
(74) *Attorney, Agent, or Firm* — Fish & Richardson P.C.

(57) ABSTRACT

A paging method, a paging device, and system are described. A mobility management network element (MME) obtains location information of user equipment (UE) in a non-3rd Generation Partnership Project (3GPP) network, where the UE already accesses the non-3GPP network. The MME receives a downlink data notification message, where the downlink data notification message carries an identifier of the UE. The MME pages the UE according to the location information of the UE in the non-3GPP network. In some implementations, a paging range may be determined according to the location information of the UE in the non-3GPP network, and a paging message does not need to be sent to all base stations in a registration area of the UE.

14 Claims, 9 Drawing Sheets

(56) References Cited

U.S. PATENT DOCUMENTS

| | | |
|---|---|---|
| 2009/0197589 A1 | 8/2009 | Kitazoe |
| 2010/0067434 A1 | 3/2010 | Siu et al. |
| 2010/0240400 A1 | 9/2010 | Choi |
| 2012/0115515 A1 | 5/2012 | Lopez et al. |
| 2014/0323180 A1* | 10/2014 | Uusitalo ............... H04W 88/06 455/553.1 |
| 2014/0334465 A1 | 11/2014 | Lee et al. |
| 2014/0378172 A1 | 12/2014 | Lim |
| 2015/0148062 A1 | 5/2015 | Chen et al. |
| 2016/0014644 A1 | 1/2016 | Yeoum et al. |
| 2016/0057724 A1* | 2/2016 | Horn .................. H04W 60/005 455/435.1 |
| 2016/0286483 A1* | 9/2016 | Bergstrom ............ H04W 48/18 |
| 2016/0345262 A1* | 11/2016 | Jain ....................... H04W 68/02 |
| 2019/0191409 A1* | 6/2019 | Stojanovski .......... H04W 80/10 |

FOREIGN PATENT DOCUMENTS

| | | |
|---|---|---|
| CN | 101374258 A | 2/2009 |
| CN | 101911802 A | 12/2010 |
| CN | 102036375 A | 4/2011 |
| CN | 102160424 A | 8/2011 |
| CN | 103096391 A | 5/2013 |
| CN | 103220653 A | 7/2013 |
| CN | 103369708 A | 10/2013 |
| CN | 103888931 A | 6/2014 |
| CN | 103945535 A | 7/2014 |
| CN | 103959893 A | 7/2014 |
| EP | 2466976 A1 | 6/2012 |
| EP | 2339785 B1 | 6/2013 |
| EP | 2713656 A2 | 4/2014 |
| EP | 2723130 A2 | 4/2014 |
| JP | 2009542147 A | 11/2009 |
| JP | 2012090282 A | 5/2012 |
| JP | 2014514784 A | 6/2014 |
| JP | 2017523629 A | 8/2017 |
| RU | 2476030 C2 | 2/2013 |
| RU | 2489812 C2 | 8/2013 |
| WO | 2007110138 A1 | 10/2007 |
| WO | 2008003679 A1 | 1/2008 |
| WO | 2012147270 A1 | 11/2012 |
| WO | 2013079765 A1 | 6/2013 |
| WO | 2014100931 A1 | 7/2014 |
| WO | 2014188268 A2 | 11/2014 |
| WO | 2015200263 A1 | 12/2015 |

OTHER PUBLICATIONS

Extended European Search Report issued in European Application No. 15903790.2 dated Jun. 27, 2018, 9 pages.

Office Action issued in Japanese Application No. 2018-513517 dated Mar. 18, 2019, 9 pages (with English translation).

Office Action issued in Chinese Application No. 201580025312.0 dated Apr. 28, 2019, 9 pages.

Russian Office Action issued in Russian Application No. 2018113178 dated Jan. 10, 2019, 17 pages.

Office action issued in Chinese Application No. 201811138855.5 dated Jun. 25, 2019, 16 pages (With English Translation).

Office Action issued in Chinese Application No. 201580025312.0 dated Dec. 4, 2019, 30 pages (with English translation).

\* cited by examiner

PAGING METHOD, DEVICE, AND SYSTEM

CROSS-REFERENCE TO RELATED APPLICATIONS

This application is a continuation of International Application No. PCT/CN2015/089515, filed on Sep. 14, 2015, the disclosure of which is hereby incorporated by reference in its entirety.

TECHNICAL FIELD

Embodiments of the present invention relate to the field of communications, and in particular, to a paging method, device, and system.

BACKGROUND

To face challenge of a wireless broadband technology and keep advantages of 3rd Generation Partnership Project networks, Long Term Evolution (LTE) plans for mobile communications networks were formulated at the end of 2004. Under the guidance of the LTE plans, a new mobile communications network architecture is defined. The architecture is flatter, and only a packet switched (PS) domain is kept. Therefore, the architecture may be referred to as an evolved 3rd Generation Partnership Project (3GPP) packet switched domain, or may be referred to as an evolved packet system (EPS).

A new 3GPP evolved packet core network (EPC) supports both a 3GPP access technology and a non-3GPP (Non-3GPP) access technology. A network architecture of a Non-3GPP access EPC includes a mobility management entity (MME), configured to be responsible for mobility management on a control plane including user context management and mobility state management, allocation of user temporary identity, and the like. A serving General Packet Radio Service support node (SGSN) is configured to implement functions such as route forwarding, mobility management, session management, and subscriber information storage in a General Packet Radio Service technology (GPRS) or Universal Mobile Telecommunications System (UMTS) network. A home subscriber server (HSS) is configured to store user subscription data. A packet data gateway (PGW) is a user plane anchor between a 3GPP access network and a Non-3GPP access network and terminates an interface of an external packet data network (packet data network, PDN). A serving gateway (SGW) is a user plane anchor between 3GPP access networks and terminates an interface of an evolved UMTS Terrestrial Radio Access Network (E-UTRAN). A trusted wireless access network (TWAN) is a trusted access network, for example, a wireless local area network (WLAN), a Worldwide Interoperability for Microwave Access (WiMax) network, and a code-division multiple access (CDMA) network defined by the Non-3GPP organization. A policy and charging rules function unit (PCRF) is configured to select and provide a usable policy and a charging control decision. An evolved packet data gateway (ePDG) is mainly configured to connect user equipment (UE) to the PGW. A 3GPP authentication, authorization, and accounting server (3GPP AAA Server) is configured to perform access authentication, authorization, and charging functions on the UE.

After the UE is connected on a 3GPP side, a network side indicates a tracking area list by using a tracking area identity list (TAI list), and uses the tracking area list as a range of a location area allocated to the UE. When the UE is on the TAI list, the network side does not need to be instructed to perform location update. Therefore, after the UE enters an idle state, if the network side needs to page the UE, the UE needs to be paged in only the range indicated by the TAI list.

In the prior art, an example in which the UE only registers with LTE is used. The PGW receives a downlink first data packet, and sends the downlink first data packet to the SGW by using a downlink data tunnel. The SGW determines whether the SGW can continue to send the first data packet to an evolved base station (eNB). If a downlink data tunnel connected to the PDN exists on the SGW, the SGW continues to send the first data packet to the eNB. If a downlink data tunnel connected to the PDN does not exist on the SGW. The SGW sends a downlink data message notification to a mobility management network element or the SGSN.

The mobility management network element or the SGSN sends a paging message to all eNBs in the area according to the TAI list in which the UE is registered. The paging message carries an identifier of the UE, a TAI parameter, and the like. The eNBs continue to send the paging message to the UE. After receiving the paging message, the UE initiates a service request procedure. Here, the network side stops paging after a connection between the network side and the UE is restored.

However, in the prior art, when paging the UE, the network side needs to notify all base station inside a registration area of the UE, that is, sends a paging message to all the eNBs in the registration area. When the registration area of the UE has a relatively large range, a quantity of paging messages that need to be sent is increased, and consequently air interface resources are occupied.

SUMMARY

Embodiments of the present invention provide a paging method and a related device and system, so as to effectively reduce paging signaling and save air interface resources.

In view of this, a first aspect of the present invention provides a paging method, including:

obtaining, by a mobility management network element, location information of user equipment UE in a non-3rd Generation Partnership Project 3GPP network, where the UE is UE that already accesses the non-3GPP network;

receiving, by the mobility management network element, a downlink data notification message, where the downlink data notification message carries an identifier of the UE; and paging, by the mobility management network element, the UE according to the location information of the UE in the non-3GPP network.

With reference to the first aspect of the embodiments of the present invention, in a first possible implementation, the paging, by the mobility management network element, the UE according to the location information of the UE in the non-3GPP network includes:

determining, by the mobility management network element, a target base station according to the location information of the UE in the non-3GPP network, and sending a first paging message to the target base station.

With reference to the first possible implementation of the first aspect of the embodiments of the present invention, in a second possible implementation, the determining, by the mobility management network element, a target base station according to the location information of the UE in the non-3GPP network includes:

determining, by the mobility management network element, the target base station according to a correspondence between the target base station and the location information of the UE in the non-3GPP network.

With reference to the first possible implementation of the first aspect of the embodiments of the present invention, in a third possible implementation, the determining, by the mobility management network element, a target base station according to the location information of the UE in the non-3GPP network includes:

determining, by the mobility management network element, location information of the UE in a 3GPP network according to the location information of the UE in the non-3GPP network; and determining, by the mobility management network element, the target base station according to a correspondence between a base station and the location information of the UE in the 3GPP network.

With reference to any one of the first aspect or the first to third possible implementations of the first aspect of the embodiments of the present invention, in a fourth possible implementation, after the receiving, by the mobility management network element, a downlink data notification message, the method further includes:

sending, by the mobility management network element, an access identifier of the 3GPP network to the UE by using a non-3GPP access gateway, where the access identifier of the 3GPP network is used to indicate a type of the accessed 3GPP network to the UE.

With reference to the fourth possible implementation of the first aspect of the embodiments of the present invention, in a fifth possible implementation, the access identifier of the 3GPP network includes a radio access technology RAT type.

With reference to the fourth possible implementation of the first aspect of the embodiments of the present invention, in a sixth possible implementation, the access identifier of the 3GPP network is access point name APN information.

With reference to the sixth possible implementation of the first aspect of the embodiments of the present invention, in a seventh possible implementation, the sending, by the mobility management network element, an access identifier of the 3GPP network to the UE by using a non-3GPP access gateway includes:

sending, by the mobility management network element, the downlink data notification message carrying the APN information to a socket interface of the UE by using a socket socket interface of the non-3GPP access gateway.

With reference to any one of the first aspect or the first to seventh possible implementations of the first aspect of the embodiments of the present invention, in an eighth possible implementation, the paging, by the mobility management network element, the UE according to the location information of the UE in the non-3GPP network includes:

sending, by the mobility management network element, a second paging message to a base station, where the second paging message carries the location information of the UE in the non-3GPP network, and the location information of the UE in the non-3GPP network is used by the base station to determine, according to the location information of the UE in the non-3GPP network, to send the first paging message to the UE.

A second aspect of the present invention provides a paging method, including:

receiving, by a base station, a first paging message sent by a mobility management network element, where the first paging message carries location information of user equipment UE in a non-3rd Generation Partnership Project 3GPP network; and determining, by the base station according to the location information of the UE in the non-3GPP network, that the UE needs to be paged, and sending, by the base station, a second paging message to the UE.

With reference to the second aspect of the embodiments of the present invention, in a first possible implementation, when the base station determines, according to the location information of the UE in the non-3GPP network, to page the UE, the sending, by the base station, a second paging message to the UE includes:

determining, by the base station, a paging range according to the location information of the UE in the non-3GPP network carried in the first paging message; and sending, by the base station, the second paging message in the paging range.

A third aspect of the present invention provides a paging method, including:

receiving, by user equipment UE, an access identifier of a 3GPP network sent by a non-3GPP access gateway, where the access identifier of the 3GPP network is used to indicate a type of the 3GPP network;

receiving, by the UE, a paging message sent by a base station; and establishing, by the UE, a connection to the 3GPP network according to the paging message and the access identifier of the 3GPP network.

With reference to the third aspect of the embodiments of the present invention, in a first possible implementation, the receiving, by user equipment UE, an access identifier of a 3GPP network sent by a non-3GPP access gateway, where the access identifier of the 3GPP network is used to indicate a type of the 3GPP network includes:

receiving, by the UE, a radio access type RAT notified by a mobility management network element by using the non-3GPP access gateway, where the RAT is used to indicate the type of the 3GPP network; and determining, by the UE, the type as the type of the accessed 3GPP network according to the RAT.

With reference to the third aspect of the embodiments of the present invention, in a second possible implementation, the receiving, by user equipment UE, an access identifier of a 3GPP network sent by a non-3GPP access gateway, where the access identifier of the 3GPP network is used to indicate a type of the 3GPP network includes:

receiving, by the UE, access point name APN information sent by the mobility management network element by using the non-3GPP access gateway, where the APN information is used to indicate the type of the 3GPP network; and determining, by the UE, the type as the type of the accessed 3GPP network according to the APN information.

With reference to the second possible implementation of the third aspect of the embodiments of the present invention, in a third possible implementation, the method further includes:

establishing, by the UE, a socket socket interface; and the receiving, by the UE, access point name APN information sent by the mobility management network element by using the non-3GPP access gateway includes:

receiving, by the UE by using the socket interface, the access point name APN information sent by the non-3GPP access gateway by using the socket interface.

A fourth aspect of the present invention provides a paging method, including:

receiving, by a non-3rd Generation Partnership Project 3GPP access gateway, an access identifier of a 3GPP network sent by a mobility management network element, where the access identifier of the network is used to indicate a type of the 3GPP network; and sending, by the non-3GPP access gateway, the access identifier of the 3GPP network to UE, to enable the UE to determine the type as the type of the accessed 3GPP network.

With reference to the fourth aspect of the embodiments of the present invention, in a first possible implementation, the receiving, by a non-3rd Generation Partnership Project 3GPP access gateway, an access identifier of a 3GPP network sent by a mobility management network element includes:

receiving, by the non-3GPP access gateway, a radio access type RAT sent by the mobility management network element, where the RAT is used to indicate the type of the 3GPP network; and the sending, by the non-3GPP access gateway, the access identifier of the 3GPP network to UE includes:

sending, by the non-3GPP access gateway, the RAT to the UE.

With reference to the fourth aspect of the embodiments of the present invention, in a second possible implementation, the receiving, by a non-3rd Generation Partnership Project 3GPP access gateway, an access identifier of a 3GPP network sent by a mobility management network element includes:

receiving, by the non-3GPP access gateway, access point name APN information sent by the mobility management network element, where the APN information is used to indicate the type of the 3GPP network; and the sending, by the non-3GPP access gateway, the access identifier of the 3GPP network to UE includes:

sending, by the non-3GPP access gateway, the APN information to the UE.

With reference to the second possible implementation of the fourth aspect of the embodiments of the present invention, in a third possible implementation, the method further includes:

establishing, by the non-3GPP access gateway, a socket socket interface; and the sending, by the non-3GPP access gateway, the APN information to the UE includes:

sending, by the non-3GPP access gateway, the APN information to a socket interface of the UE by using the socket interface, where the APN information is used to indicate the type of the 3GPP network, to enable the UE to determine the type as the type of the accessed 3GPP network.

A fifth aspect of the present invention provides a mobility management network element, including:

a processing module, configured to obtain location information of user equipment UE in a non-3rd Generation Partnership Project 3GPP network, where the UE is UE that already accesses the non-3GPP network; and a receiving module, configured to receive a downlink data notification message, where the downlink data notification message carries an identifier of the UE, where the processing module is further configured to page the UE according to the location information of the UE in the non-3GPP network.

With reference to the fifth aspect of the embodiments of the present invention, in a first possible implementation, the mobility management network element further includes a sending module, and the processing module is specifically configured to: determine a target base station according to the location information of the UE in the non-3GPP network, and control the sending module to send a first paging message to the target base station.

With reference to the first possible implementation of the fifth aspect of the embodiments of the present invention, in a second possible implementation, the processing module is specifically configured to determine the target base station according to a correspondence between the target base station and the location information of the UE in the non-3GPP network.

With reference to the first possible implementation of the fifth aspect of the embodiments of the present invention, in a third possible implementation, the processing module is specifically configured to determine location information of the UE in a 3GPP network according to the location information of the UE in the non-3GPP network, and determine the target base station according to a correspondence between a base station and the location information of the UE in the 3GPP network.

With reference to any one of the fifth aspect or the first to third possible implementations of the fifth aspect of the embodiments of the present invention, in a fourth possible implementation, the sending module is further configured to: after the receiving module receives the downlink data notification message, send an access identifier of the 3GPP network to the UE by using a non-3GPP access gateway, where the access identifier of the 3GPP network is used to indicate a type of the accessed 3GPP network to the UE.

With reference to the fourth possible implementation of the fifth aspect of the embodiments of the present invention, in a fifth possible implementation, the access identifier of the 3GPP network includes a radio access technology RAT type.

With reference to the fifth possible implementation of the fifth aspect of the embodiments of the present invention, in a sixth possible implementation, the access identifier of the 3GPP network is access point name APN information.

With reference to the sixth possible implementation of the fifth aspect of the embodiments of the present invention, in a seventh possible implementation, the sending, by the sending module, an access identifier of the 3GPP network to the UE by using a non-3GPP access gateway includes sending, by the sending module, the downlink data notification message carrying the APN information to a socket interface of the UE by using a socket socket interface of the non-3GPP access gateway.

With reference to any one of the fifth aspect or the first to seventh possible implementations of the fifth aspect of of the embodiments of the present invention, in an eighth possible implementation, the mobility management network element further includes a sending module, where the sending module is specifically configured to send a second paging message to a base station, where the second paging message carries the location information of the UE in the non-3GPP network, and the location information of the UE in the non-3GPP network is used by the base station to determine, according to the location information of the UE in the non-3GPP network, to send the first paging message to the UE.

A sixth aspect of the present invention provides a base station, including:

a receiving module, configured to receive a first paging message sent by a mobility management network element, where the first paging message carries location information of user equipment UE in a non-3rd Generation Partnership Project 3GPP network;

a sending module, configured to send a second paging message to the UE; and a processing module, configured to: after the receiving module receives the first paging message, when determining, according to the location information of the UE in the non-3GPP network, to page the UE, control the sending module to send the second paging message to the UE.

With reference to the sixth aspect of the embodiments of the present invention, in a first possible implementation, the processing module is specifically configured to: determine a paging range according to the location information of the UE in the non-3GPP network carried in the first paging message received by the receiving module, and control the sending module to send the second paging message to the UE in the paging range.

A seventh aspect of the present invention provides user equipment, including:

a first receiving module, configured to receive an access identifier of a 3GPP network sent by a non-3GPP access gateway, where the access identifier of the 3GPP network is used to indicate a type of the 3GPP network;

a second receiving module, configured to receive a paging message sent by a base station; and an establishing module, configured to establish a connection to the 3GPP network according to the paging message received by the second receiving module and the access identifier of the 3GPP network received by the first receiving module.

With reference to the seventh aspect of the embodiments of the present invention, in a first possible implementation, the first receiving module includes:

a first receiving unit, configured to receive a radio access type RAT notified by a mobility management network element by using the non-3GPP access gateway, where the RAT is used to indicate the type of the 3GPP network; and a first determining unit, configured to determine the type as the type of the accessed 3GPP network according to the RAT received by the first receiving unit.

With reference to the seventh aspect of the embodiments of the present invention, in a second possible implementation, the first receiving module includes:

a second receiving unit, configured to receive access point name APN information sent by the mobility management network element by using the non-3GPP access gateway, where the APN information is used to indicate the type of the 3GPP network; and a second determining unit, configured to determine the type as the type of the accessed 3GPP network according to the APN information received by the second receiving unit.

With reference to the second possible implementation of the seventh aspect of the embodiments of the present invention, in a third possible implementation, the user equipment further includes:

an interface establishing module, configured to establish a socket socket interface; and the second receiving unit includes:

a receiving subunit, configured to receive, by using the socket interface, the access point name APN information sent by the non-3GPP access gateway by using the socket interface.

An eighth aspect of the present invention provides a non-3GPP access gateway, including:

a receiving module, configured to receive an access identifier of a 3GPP network sent by a mobility management network element, where the access identifier of the network is used to indicate a type of the 3GPP network; and a sending module, configured to send, to UE, the access identifier of the 3GPP network received by the receiving module, to enable the UE to determine the type as the type of the accessed 3GPP network.

With reference to the eighth aspect of the embodiments of the present invention, in a first possible implementation, the receiving module includes:

a first receiving unit, configured to receive a radio access type RAT sent by the mobility management network element, where the RAT is used to indicate the type of the 3GPP network; and the sending module includes:

a first sending unit, configured to send, to the UE, the RAT received by the first receiving unit.

With reference to the eighth aspect of the embodiments of the present invention, in a second possible implementation, the receiving module includes:

a second receiving unit, configured to receive access point name APN information sent by the mobility management network element, where the APN information is used to indicate the type of the 3GPP network; and the sending module includes:

a second sending unit, configured to send, to the UE, the APN information received by the second receiving unit.

With reference to the second possible implementation of the eighth aspect of the embodiments of the present invention, in a third possible implementation, the non-3GPP access gateway further includes:

an interface establishing module, configured to establish a socket socket interface; and the second sending unit includes:

a sending subunit, configured to send the APN information to a socket interface of the UE, where the APN information is used to indicate the type of the 3GPP network, to enable the UE to determine the type as the type of the accessed 3GPP network.

A ninth aspect of the present invention provides a mobility management network element, including: an input apparatus, an output apparatus, a memory, and a processor, where the processor is configured to perform the following steps: obtaining location information of user equipment UE in a non-3rd Generation Partnership Project 3GPP network, where the UE is UE that already accesses the non-3GPP network; and paging the UE according to the location information of the UE in the non-3GPP network; and the input apparatus is configured to perform the following step:

receiving a downlink data notification message, where the downlink data notification message carries an identifier of the UE.

A tenth aspect of the present invention provides a base station, including: an input apparatus, an output apparatus, a memory, and a processor, where the input apparatus is configured to perform the following step:

receiving a first paging message sent by a mobility management network element, where the first paging message carries location information of user equipment UE in a non-3rd Generation Partnership Project 3GPP network; and the processor is configured to perform the following step: when the base station determines, according to the location information of the UE in the non-3GPP network, to page the UE, sending, by the base station, a second paging message to the UE.

An eleventh aspect of the present invention provides user equipment, including: an input apparatus, an output apparatus, a memory, and a processor, where the input apparatus is configured to perform the following step:

receiving an access identifier of a 3GPP network sent by a non-3GPP access gateway, where the access identifier of the 3GPP network is used to indicate a type of the 3GPP network; and the output apparatus is configured to perform the following step:

receiving a paging message sent by a base station;

the processor is configured to perform the following step:

establishing a connection to the 3GPP network according to the paging message and the access identifier of the 3GPP network.

A twelfth aspect of the present invention provides a non-3rd Generation Partnership Project 3GPP access gateway, including: an input apparatus, an output apparatus, a memory, and a processor, where the input apparatus is configured to perform the following step:

receiving an access identifier of a 3GPP network sent by a mobility management network element, where the access identifier of the network is used to indicate a type of the 3GPP network; and the output apparatus is configured to perform the following step:

sending the access identifier of the 3GPP network to UE, to enable the UE to determine the type as the type of the accessed 3GPP network.

A thirteenth aspect of the present invention provides a paging system, including: a mobility management network element and a base station, where the mobility management network element is the mobility management network element according to any one of the third aspect or the first to eighth possible implementations of the third aspect of the present invention; and the base station is the base station according to the fourth aspect or the first possible implementation of the fourth aspect of the present invention.

In this embodiment of the present invention, the mobility management network element obtains the location information of the non-3GPP network of the UE, and when paging the UE in the 3GPP network, may determine the paging range according to the location information of the UE in the non-3GPP network but does not need to send the paging message to all base stations in a registration area of the UE, so that paging signaling is effectively reduced, and air interface resources are saved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of the present invention provides a paging method, so as to effectively reduce paging signaling and save air interface resources, and in addition, further provides a corresponding paging system and related device. Referring to FIG. 1 to FIG. 15, the following separately provides detailed descriptions by means of specific embodiments.

Figure 1:
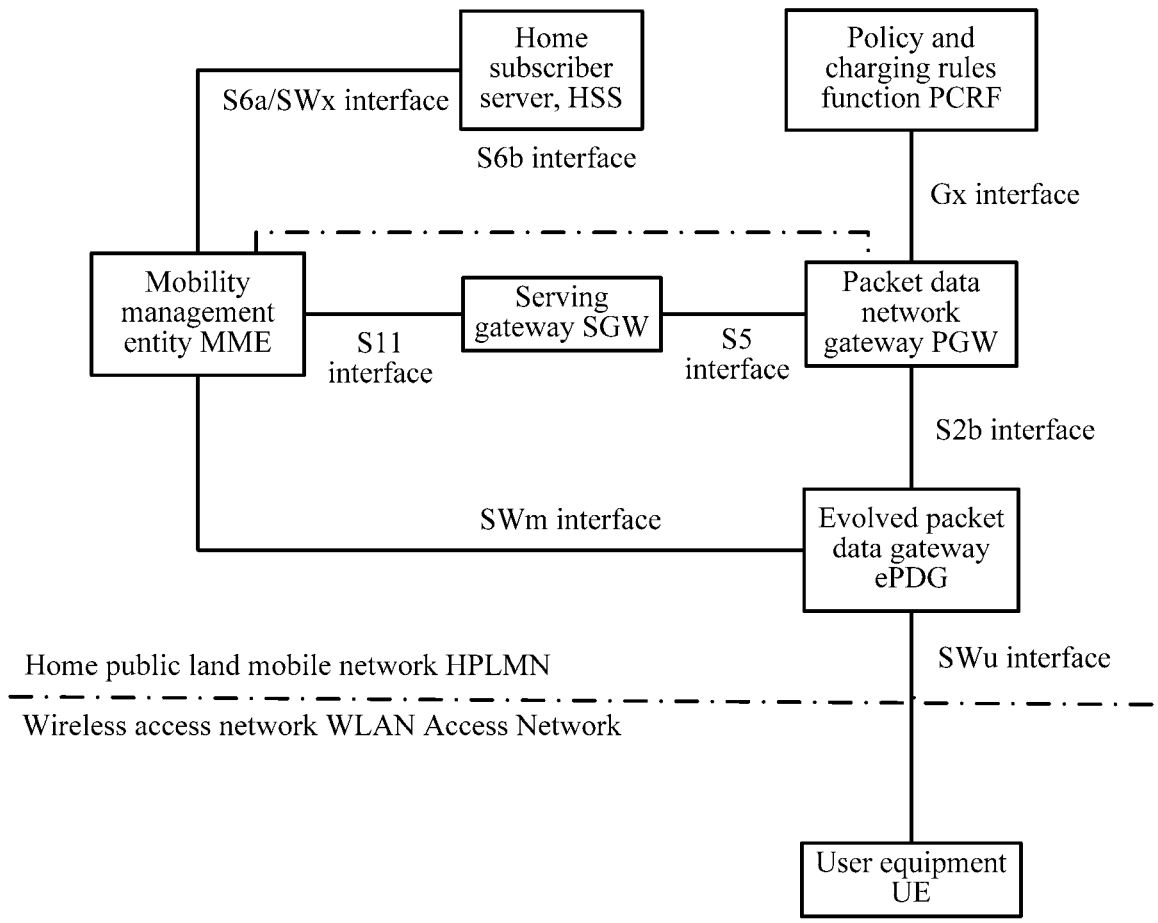
FIG. 1 is a schematic diagram of an architecture integrating a mobility management network element and a 3GPP AAA server according to an embodiment of the present invention.

The paging method provided in this embodiment of the present invention may be applied to a wireless communications system. An improved mobility management network element is further used in this embodiment of the present invention. Specifically, a function of a 3GPP AAA server is added to a conventional mobility management network element MME. Referring to FIG. 1, FIG. 1 is a schematic diagram of an architecture integrating a mobility management network element and a 3GPP AAA server according to this embodiment of the present invention.

In FIG. 1, a 3GPP network corresponding to a home public land mobile network (home public land mobile network, HPLMN) identifier is used as an example and a WLAN network is used as an example for a non-3GPP network to perform description. A logic function of a 3GPP AAA Server is deployed in the mobility management network element MME used in the present invention. An S6a interface between the mobility management network element and an HSS is mainly upgraded to an SWx interface that supports communication between the 3GPP AAA Server and the HSS. An SWm interface between an ePDG and the 3GPP AAA Server is still maintained. However, an S6b interface between a PGW and the 3GPP AAA Server is no longer deployed.

In the deployment, authentication functions, gateway selection functions, and the like of the MME and the 3GPP AAA Server may be unified, and location information of the 3GPP network and the non-3GPP network may be shared between the MME and the 3GPP AAA Server, so as to optimize paging.

The interfaces before and after the upgrade in a process of integrating the MME and the 3GPP AAA Server are described below.

The S6a interface before the upgrade transports signaling on a control plane and is mainly used for subscription data including an International Mobile Subscriber Identity (IMSI), subscriber locations, roaming restriction, quality of service (QoS) or the like. This type information is exchanged by using an operation such as location update of the S6a interface or insertion of subscriber data. The S6a interface is further used for authentication data including an authentication parameter. This type information is exchanged by using an authentication operation at the S6a interface.

The SWx interface after the upgrade is an interface between the 3GPP AAA Server and the HSS and is mainly used for performing authentication for access of UE to the EPC network, and is also used for updating address information of a packet data gateway (PDN-GW) stored on the HSS.

During use of the network architecture integrating the mobility management network element and the 3GPP AAA Server, the embodiments of the present invention are applied to a scenario of access of the UE on both a 3GPP side and a non-3GPP side.

For ease of understanding, the solution of the present invention is described below in detail from the perspective of a mobility management network element.

Figure 2:
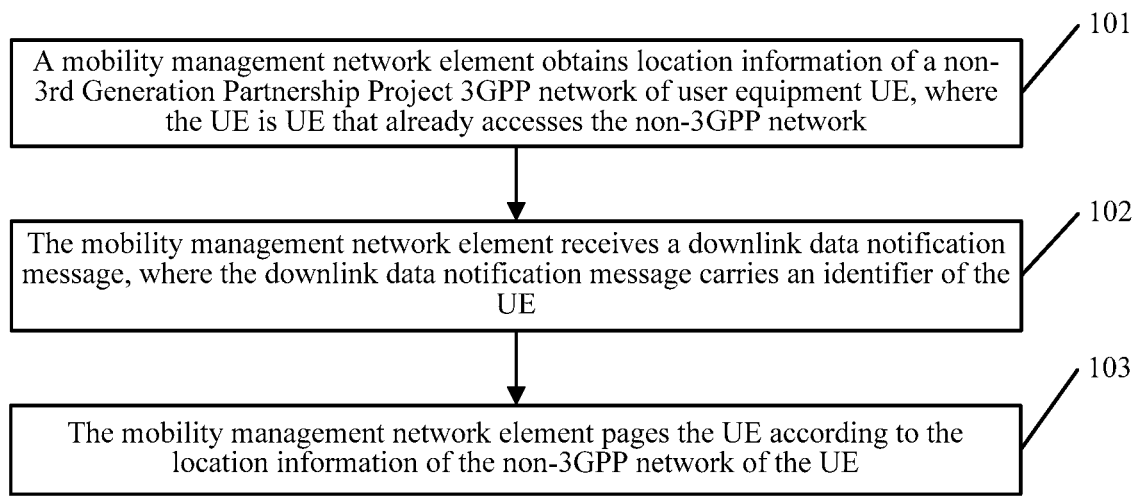
FIG. 2 is a schematic diagram of an embodiment of a paging method according to an embodiment of the present invention.

Referring to FIG. 2, FIG. 2 is a schematic diagram of an embodiment of a paging method according to an embodiment of the present invention. The paging method may include the following steps.

101. A mobility management network element obtains location information of user equipment UE in a non-3rd Generation Partnership Project 3GPP network, where the UE is UE that already accesses the non-3GPP network.

In this embodiment, when UEs access the non-3GPP network, the mobility management network element obtains the location information of the non-3GPP network of these UEs. The non-3GPP network may usually be a WLAN network, a WiMax network or a CDMA network. The location information of the non-3GPP network here may be location information of the WLAN.

When UE is turned on, the UE needs to perform a non-3GPP attach procedure and a 3GPP attach procedure.

Specifically, the non-3GPP attach procedure completed by the UE is similar to that in an existing solution. For example, for access to a trusted wireless local area network WLAN (TWAN), a session connection is established between the TWAN and a 3GPP AAA Server for the attach of the UE. In a process of establishing the session connection, the TWAN sends an identifier of the WLAN, for example, a service set identifier (SSID), a basic service set identifier (BSSID) or a homogenous extended service set identifier (HESSID) of the WLAN, or information about a geographical location of the WLAN, or information about a 3GPP location, for example, an identifier of a 3GPP cell of the WLAN, to the 3GPP AAA Server. The 3GPP AAA Server registers an identifier of the 3GPP AAA Server with an HSS.

For access to an untrusted WLAN, a session connection is established between an ePDG and the 3GPP AAA Server for the attach of the UE. The ePDG sends the location information obtained from the UE to the 3GPP AAA Server. The location information obtained from the UE may include an identifier of the WLAN, for example, an SSID, a HESSID or a BSSID of the WLAN, or may be information about a geographical location of the WLAN or a 3GPP location, for example, an identifier of a 3GPP cell, of the UE, are sent to the ePDG The ePDG sends the information to the 3GPP AAA Server. The 3GPP AAA Server registers an identifier of the 3GPP AAA Server with the HSS. Because the 3GPP AAA Server and the mobility management network element are integrally deployed, the mobility management network element obtains the location information obtained by the 3GPP AAA Server, where the location information includes the location information of the UE in the non-3GPP network or location information of a 3GPP network at which the UE is currently located.

The 3GPP attach procedure completed by the UE is similar to that in an existing solution. For example, the UE obtains a temporary identity and a TAI list that are allocated by the mobility management network element. A network side establishes a bearer resource for the UE, and registers an identifier of the mobility management network element serving the UE with the HSS.

102. The mobility management network element receives a downlink data notification message, where the downlink data notification message carries an identifier of the UE.

In this embodiment, a PGW receives a downlink data packet of a user, and selects a suitable bearer tunnel according to information in a data flow. The PGW sends the downlink data packet to an SGW by using the bearer tunnel. After receiving the downlink data packet. The SGW sends the downlink data notification message to the mobility management network element, where the downlink data notification message carries the identifier of the UE, to enable the mobility management network element to determine the UE according to the identifier of the UE in the downlink data notification message.

103. The mobility management network element pages the UE according to the location information of the UE in the non-3GPP network.

In this embodiment, the mobility management network element determines, according to the location information of the UE in the non-3GPP network, a range for paging the UE.

It should be noted that, a sequence of performing step 101 and step 102 in this embodiment of the present invention is not fixed, and is not limited herein.

In this embodiment of the present invention, the mobility management network element obtains the location information of the UE in the non-3GPP network, and when paging the UE in the 3GPP network, may determine a paging range according to the location information of the UE in the non-3GPP network but does not need to send a paging message to all base stations in a registration area of the UE, so that paging signaling is effectively reduced, and air interface resources are saved.

Optionally, based on the embodiment corresponding to the foregoing FIG. 2, in a first optional embodiment of the paging method provided in this embodiment of the present invention, the paging, by the mobility management network element, the UE according to the location information of the UE in the non-3GPP network may include:

determining, by the mobility management network element, a target base station according to the location information of the UE in the non-3GPP network, and sending a first paging message to the target base station.

In this embodiment, the mobility management network element determines the target base station according to the location information of the UE in the non-3GPP network. Specifically, the mobility management network element may select, based on the location information of the current non-3GPP network of the UE, one or more base stations near the current non-3GPP network as the target base station. Generally, the mobility management network element selects a base station nearest to the location of the non-3GPP network of the UE as the target base station. If the location of the non-3GPP network of the UE is located in an overlapped coverage area of several base stations, the mobility management network element may select the several base stations as the target base station.

The mobility management network element sends the first paging message to the target base station. If there is one target base station, the target base station directly sends the first paging message to the UE. If there are multiple target base stations, the target base stations send the first paging message to the UE, and the UE receives a paging message that arrives first. Here, a paging process is completed.

The first paging message is similar to a paging message in the prior art, and may not include the location information of the UE in the non-3GPP network. That is, the target base station sends, to the UE by using an existing manner, a paging message that does not carry the location information of the UE in the non-3GPP network.

Next, in this embodiment of the present invention, a relationship between a base station and location information of the non-3GPP network may be configured on the mobility management network element. The mobility management network element determines the target base station according to the location information of the UE in the non-3GPP network. The target base station may send the first paging message to the UE by using the prior art. In this way, the mobility management network element may not need to send a paging message to all base stations in the registration area of the UE. Generally, there is only one target base station. In this way, a quantity of selected base stations is greatly reduced, paging signaling is further reduced, and air interface resources are saved.

Optionally, based on the first optional embodiment corresponding to the foregoing FIG. 2, in a second optional embodiment of the paging method provided in this embodiment of the present invention, the determining, by the mobility management network element, a target base station according to the location information of the UE in the non-3GPP network may include:

determining, by the mobility management network element, the target base station according to a correspondence between the target base station and the location information of the UE in the non-3GPP network.

In this embodiment, the mobility management network element needs to first configure a correspondence between a base station and the location information of the UE in the non-3GPP network. When obtaining the location information of the UE in the non-3GPP network, the mobility management network element may determine the corresponding target base station according to the location information and the configured correspondence between the base station and the location information of the UE in the non-3GPP network.

It should be noted that, the correspondence between the base station and the location information of the non-3GPP network may be configured in multiple manners. For example, a relationship list between a base station and location information of the corresponding non-3GPP network is configured on the mobility management network element. Location information of several nearby non-3GPP networks may be configured for one base station. When at least one of identifiers SSID, HESSID or BSSID of the WLAN of the UE is location information of the non-3GPP network corresponding to a base station in the relationship list, the base station is selected as the target base station. Alternatively, when at least one of geographical latitude and longitude or a city/street name of UE has a short distance from a base station, the base station may be selected as the target base station. Therefore, here, configuration of the correspondence between the target base station and the location information of the UE in the non-3GPP network is not limited.

Next, in this embodiment of the present invention, a correspondence between a location of the base station and location information of the non-3GPP network may be configured on the mobility management network element. After the location information of the UE in the non-3GPP network is obtained, it is implemented that the mobility management network element selects a specific implementation of the target base station according to the correspondence, thereby improving feasibility and operability of a solution during actual application.

Optionally, based on the first optional embodiment corresponding to the foregoing FIG. 2, in a third optional embodiment of the paging method provided in this embodiment of the present invention, the determining, by the mobility management network element, a target base station according to the location information of the UE in the non-3GPP network may include:

determining, by the mobility management network element, the location information of the UE in the 3GPP network according to the location information of the UE in the non-3GPP network; and determining, by the target base station, the mobility management network element according to a correspondence between a base station and the location information of the UE in the 3GPP network.

In this embodiment, after obtaining the location information of the UE in the non-3GPP network, the mobility management network element may determine the location information of the UE in the 3GPP network according to the location information of the UE in the non-3GPP network. The precision reaches the granularity of cells. The precision may reach specific cells.

The mobility management network element preconfigures the correspondence between the location of the base station and the location information of the UE in the 3GPP network. The location of the 3GPP network here means the location information corresponding to the 3GPP network when the base station accesses the network side. After obtaining the location information of the UE in the 3GPP network, the mobility management network element determines, according to the configured correspondence between the base station and the location information of the 3GPP network, the target base station that sends a paging message to the UE, where a correspondence may exist between the location information of the UE in the 3GPP network and the location of the base station.

When the mobility management network element sends a paging message to the UE by using the target base station, the target base station corresponds to the location information of the UE in the 3GPP network. The location information of the UE in the 3GPP network is determined by the mobility management network element according to the location information of the UE in the non-3GPP network. Specifically, the mobility management network element obtains the location information of the non-3GPP network of some UEs. For example, city/street names of UE1, UE2, UE3, and UE4 are respectively ROAD1, ROAD2, ROAD3, and ROAD4. When UE2 needs to be paged, the mobility management network element may retrieve cell identifier information from ROAD2, and determine a specific cell according to the cell identifier information, so as to determine location information of the 3GPP network of UE2.

Next, in this embodiment of the present invention, the location information of the 3GPP network is determined by using the location information of the UE in the non-3GPP network, and the location information of the UE in the 3GPP network may be located more precisely. In an existing solution, when the 3GPP network is used to page UE in an idle state, the obtained paging range is relatively large, and multiple location areas may be included. Each location area is formed of multiple cells. Therefore, in this embodiment, location information of the UE in the 3GPP network is used to determine the paging range, so that the paging range can further be reduced, thereby reducing sending of paging messages, so as to save air interface resources.

Figure 3:
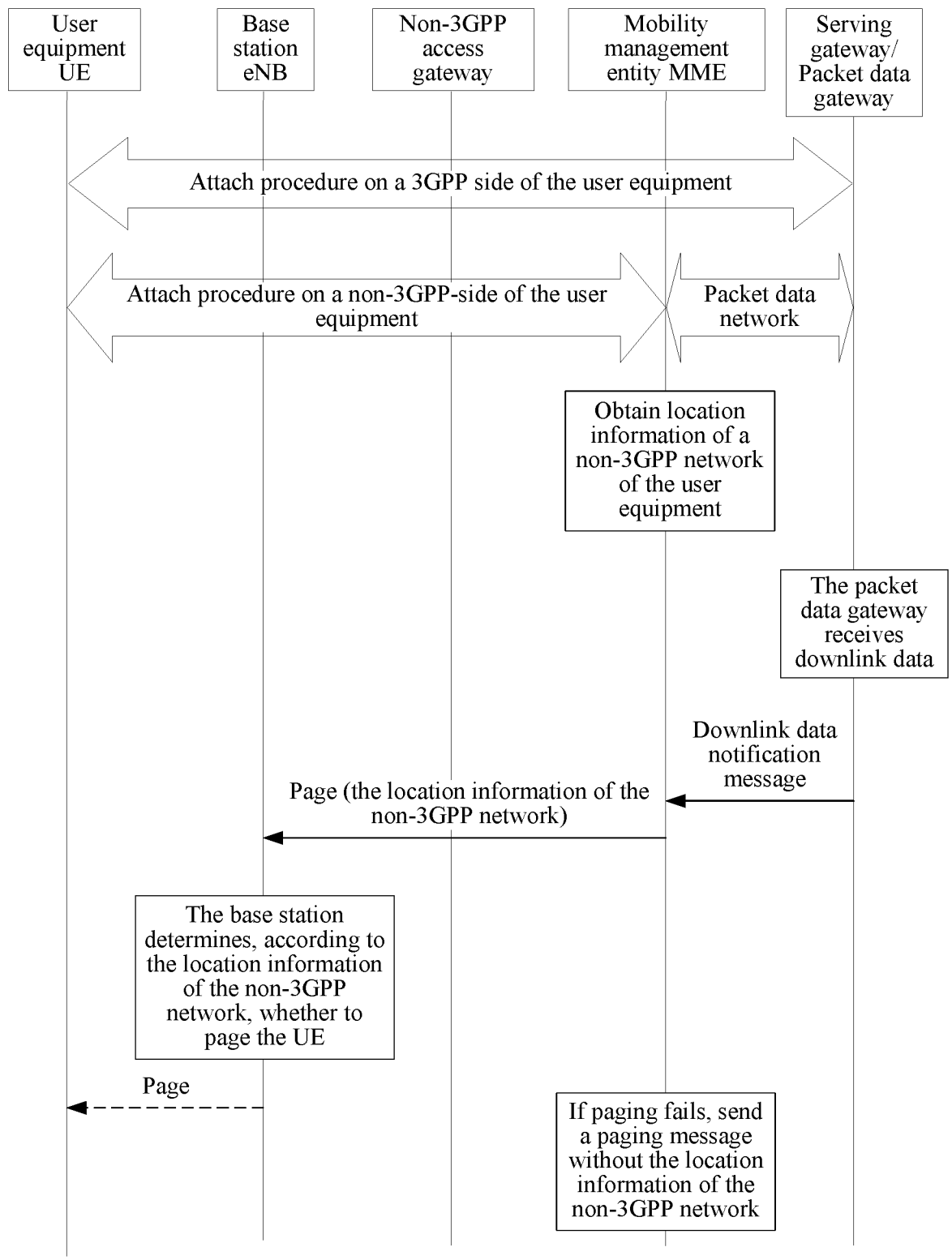
FIG. 3 is a schematic flowchart of a paging optimization solution according to an embodiment of the present invention.

A paging optimization solution is provided in FIG. 2 and the first to third optional embodiments corresponding to FIG. 2. Specifically, referring to FIG. 3, FIG. 3 is a schematic flowchart of the paging optimization solution.

The UE completes attach procedures on a 3GPP side and a non-3GPP side. During the non-3GPP attach of the UE, the obtaining, by the mobility management network element, the location information of the UE in the non-3GPP network may specifically include: in a scenario of a trusted WLAN, the TWAN sends an authentication and authorization request message to the mobility management network element. The message carries the location information of the current non-3GPP network of the UE. In a scenario of an untrusted WLAN, an untrusted WLAN access network or the ePDG adds an authentication and authorization request message to the location information of the current non-3GPP network of the UE, and reports the information to the mobility management network element. In this way, the mobility management network element may obtain the location information of the UE in the non-3GPP network.

The PGW receives the downlink data packet, selects a suitable bearer tunnel according to a data flow in the data packet, and further sends the downlink data packet to the SGW. The SGW sends the downlink data notification message to the mobility management network element by using a PDN, and triggers the mobility management network element to page the target base station according to the location information of the UE in the non-3GPP network. After receiving a paging message, the base station determines, based on the location information of the UE in the non-3GPP network, whether the location of the UE is in the paging range. If the location of the UE is in the paging range, the mobility management network element pages the UE. If the location of the UE is not in the paging range, the mobility management network element does not page the UE.

After triggering paging, the mobility management network element starts a paging timer. The paging timer is configured to calculate a paging time. If a service request message initiated by the UE is still not received after a paging time ends, the mobility management network element pages the UE again. The service request message is used to instruct the mobility management network element to send data to the UE by using a data connection channel. In the solution of paging the UE again, a paging message may be sent to all base stations in a location registration area of the UE. That is, a method in the prior art is used.

In the foregoing embodiment, for the present invention, a paging process on a 3GPP network side is optimized based on the location information of the UE in the non-3GPP network. How to establish paging is described below in detail. For a process of establishing a paging connection between the UE and the mobility management network element, refer to the detailed description in the following embodiments.

Optionally, based on the foregoing FIG. 2 and the first to third optional embodiments corresponding to FIG. 2, in a fourth optional embodiment of the paging method provided in this embodiment of the present invention, after the receiving, by the mobility management network element, a downlink data notification message, the paging method may further include:

sending, by the mobility management network element, an access identifier of the 3GPP network to the UE by using a non-3GPP access gateway, where the access identifier of the 3GPP network is used to indicate a type of the accessed 3GPP network to the UE.

In this embodiment, after receiving the downlink data notification message, the mobility management network element may send the access identifier of the 3GPP network to the UE by using the non-3GPP access gateway, where the access identifier of the 3GPP network is used to indicate the type of the 3GPP network, to enable the UE to determine the type of the accessed 3GPP network. The UE is registered in the 3GPP network indicated by the access identifier of the 3GPP network, and receives a paging message by using the 3GPP network.

It should be noted that, the access identifier of the 3GPP network may be a radio access technology (RAT) type, or may be an access point name (APN), or may be other identifier information that can be used to indicate the 3GPP network, and is not limited herein.

Next, in this embodiment of the present invention, a manner in which UE accesses the 3GPP network is described. The UE may receive the access identifier of the 3GPP network sent by the network side, and determine, by using the access identifier of the 3GPP network, to receive paging in the corresponding 3GPP network. In this way, the UE can rapidly and accurately connect to the 3GPP network.

Optionally, based on the fourth optional embodiment corresponding to the foregoing FIG. 2, in a fifth optional embodiment of the paging method provided in this embodiment of the present invention, the access identifier of the 3GPP network includes a radio access technology RAT type.

In this embodiment, after the receiving, by the mobility management network element, a downlink data notification message, the mobility management network element may send a message carrying the RAT to the non-3GPP access gateway. The non-3GPP access gateway notifies the RAT to the UE again, so that after receiving the RAT, the UE initiates restoration of an air interface connection under a corresponding instruction, to complete a process of establishing a data connection channel with a target network. The RAT may be understood as one specific identifier of access identifiers of the 3GPP network.

It should be noted that, the mobility management network element sends the RAT to the non-3GPP access gateway in multiple manners. The downlink data notification message may be used to carry the RAT, or a connection request between the mobility management network element and the non-3GPP access gateway may be used to carry the RAT, or the RAT may further be added to a paging message sent to the UE. Therefore, the manner of sending the RAT is not limited here.

The non-3GPP access gateway instructs the UE to restore the air interface connection indicated by the RAT. For an instruction manner, the non-3GPP access gateway may send downlink data carrying the RAT to the UE, or, another message transmitted between the non-3GPP access gateway and the UE carries the RAT.

It may be understood that the RAT includes a Global System for Mobile Communications (GSM) access technology, a CDMA access technology, a GPRS access technology, a cellular digital packet data switched network (CDPD) access technology, and the like, and is therefore not specifically limited here.

Further, in this embodiment of the present invention, the mobility management network element instructs the UE on a control plane by using the non-3GPP access gateway to restore a connection to the 3GPP network side, to enable the UE to receive data by using the target network. The non-3GPP network is used to notify the UE that data is delivered from the 3GPP network side, and the UE establishes a connection to the target network according to the RAT. A paging connection between the UE and the 3GPP network can be precisely established according to an actual condition, so as not to occupy excessive network resources. Moreover, switching may be performed between different target networks, thereby increasing the feasibility and flexibility of the solution.

Figure 4:
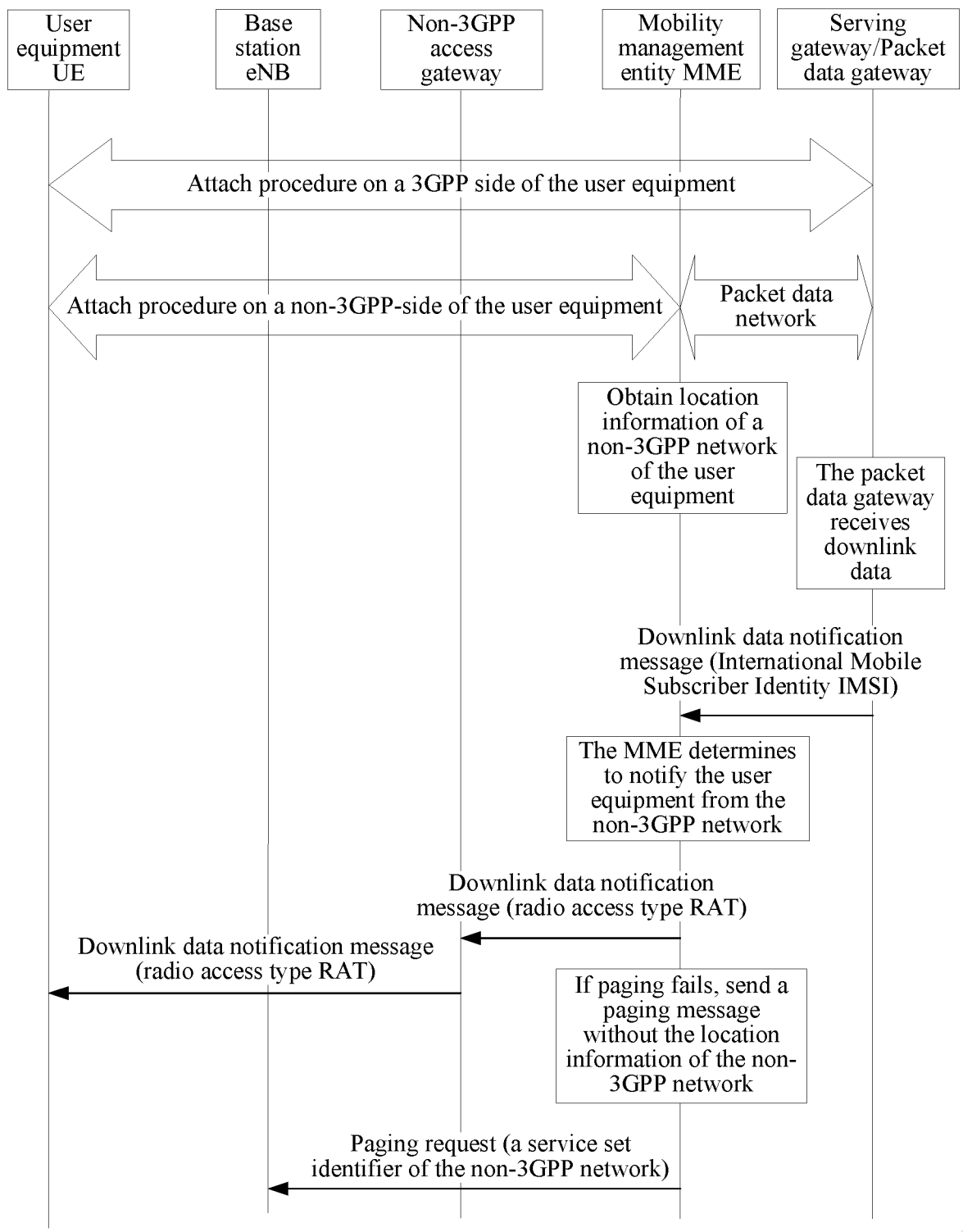
FIG. 4 is a schematic flowchart of UE restoring a connection to a 3GPP network according to an embodiment of the present invention.

In a fifth optional embodiment corresponding to FIG. 2, a solution of UE restoring a connection to the 3GPP network is provided. Specifically, referring to FIG. 4, FIG. 4 is a schematic flowchart of UE restoring a connection to the 3GPP network.

The UE completes the attach procedure on the 3GPP side and the attach procedure on the non-3GPP side. The PGW receives the downlink data packet, selects a suitable bearer tunnel according to a data flow in the data packet, and further sends the downlink data packet to the SGW. The SGW sends the downlink data notification message to the mobility management network element by using the PDN. The downlink data notification message may include an International Mobile Subscriber Identity (IMSI). The IMSI is the identifier of the UE, so as to determine specific information of the UE.

When the mobility management network element determines that the UE accesses the non-3GPP network, the mobility management network element adds the RAT to the downlink data notification message. The RAT indicates that the UE needs to restore an air interface connection corresponding to the RAT. For example, when the RAT indicates access to the 3GPP network, it represents that downlink data arrives from the 3GPP network side for the UE, and the UE needs to establish a connection to the 3GPP network.

The mobility management network element sends the downlink data notification message including the RAT to the UE by using the non-3GPP access gateway, to enable the UE to initiate restoration of an air interface connection in a corresponding standard after receiving the RAT. For example, when the RAT indicates access of the UE on the 3GPP network side, the UE initiates a service request message on the 3GPP network side to the mobility management network element, so as to restore a connection on the 3GPP network side.

After triggering paging, the mobility management network element starts a paging timer. The paging timer is configured to calculate a paging time. If the service request message initiated by the UE is still not received after a paging time ends, the mobility management network element pages the UE again. The service request message is used to instruct the mobility management network element to send data to the UE by using a data connection channel. In the solution of paging the UE again, a paging message may be sent to all base stations in a location registration area of the UE. That is, a method in the prior art is used, or a corresponding paging manner in FIG. 2 in this embodiment of the present invention may be used. This is not limited here.

Optionally, based on the fourth optional embodiment corresponding to the foregoing FIG. 2, in a sixth optional embodiment of the paging method provided in this embodiment of the present invention, the access identifier of the 3GPP network is access point name APN information.

In this embodiment, after the receiving, by the mobility management network element, the downlink data notification message, the mobility management network element may send a message carrying the APN information to a 3GPP access gateway. Specifically, the PGW receives the downlink data packet, and configures a corresponding flow template for flow information, thereby obtaining the APN information corresponding to the downlink data packet. The flow information may be a source Internet Protocol (IP) address, a destination IP address, a source port number, a destination port number, and a transport layer protocol included in a data packet quintet.

During actual application, the PGW may add the obtained APN information to the downlink data notification message to notify the mobility management network element, to enable the mobility management network element to obtain the APN information; or, the downlink data notification message carries a tunnel endpoint identifier (TEID), and the TEID is used to indicate a connection between the mobility management network element and the PDN that downlink data belongs to, thereby determining the APN information corresponding to the PDN.

It should be noted that, the mobility management network element sends the APN information to the non-3GPP access gateway in multiple manners. The downlink data notification message may be used to carry the APN information, or a connection request between the mobility management network element and the non-3GPP access gateway may be used to carry the APN information, or another manner of carrying the APN information may further be used. Therefore, the manner of sending the APN information is not limited here.

The non-3GPP access gateway sends a null packet or a special data packet on the PDN corresponding to the APN information according to the APN information, to notify the UE that data is about to be sent by using the PDN, so as to enable the UE to determine a specific PDN from which a data packet is transmitted. After receiving the null packet or the special data packet, the UE restores corresponding connections of a PDN connection in all standards. For example, when the UE is in an idle state on the 3GPP network side, the UE receives, on a non-3GPP network side, a null packet or a special data packet sent on the PDN connection. If the PDN connection also supports access to the 3GPP network, the UE initiates restoration of an air interface connection on the 3GPP side, to complete a connection to the 3GPP network. If the UE has established a connection to the 3GPP network, the connection restoration does not need to be performed.

Further, in this embodiment of the present invention, the mobility management network element instructs, on a user plane by using the non-3GPP access gateway, the UE to restore a connection to the 3GPP network side, so as to enable the UE to receive data by using the 3GPP network. The non-3GPP network is used to notify the UE that data is delivered from the 3GPP network side, and the UE establishes a connection to the 3GPP network according to the APN information. In this way, the UE establishes an accurate data connection channel according to an actual condition, so as to save network resources. Moreover, the efficiency of data transmission may be increased.

Figure 5:
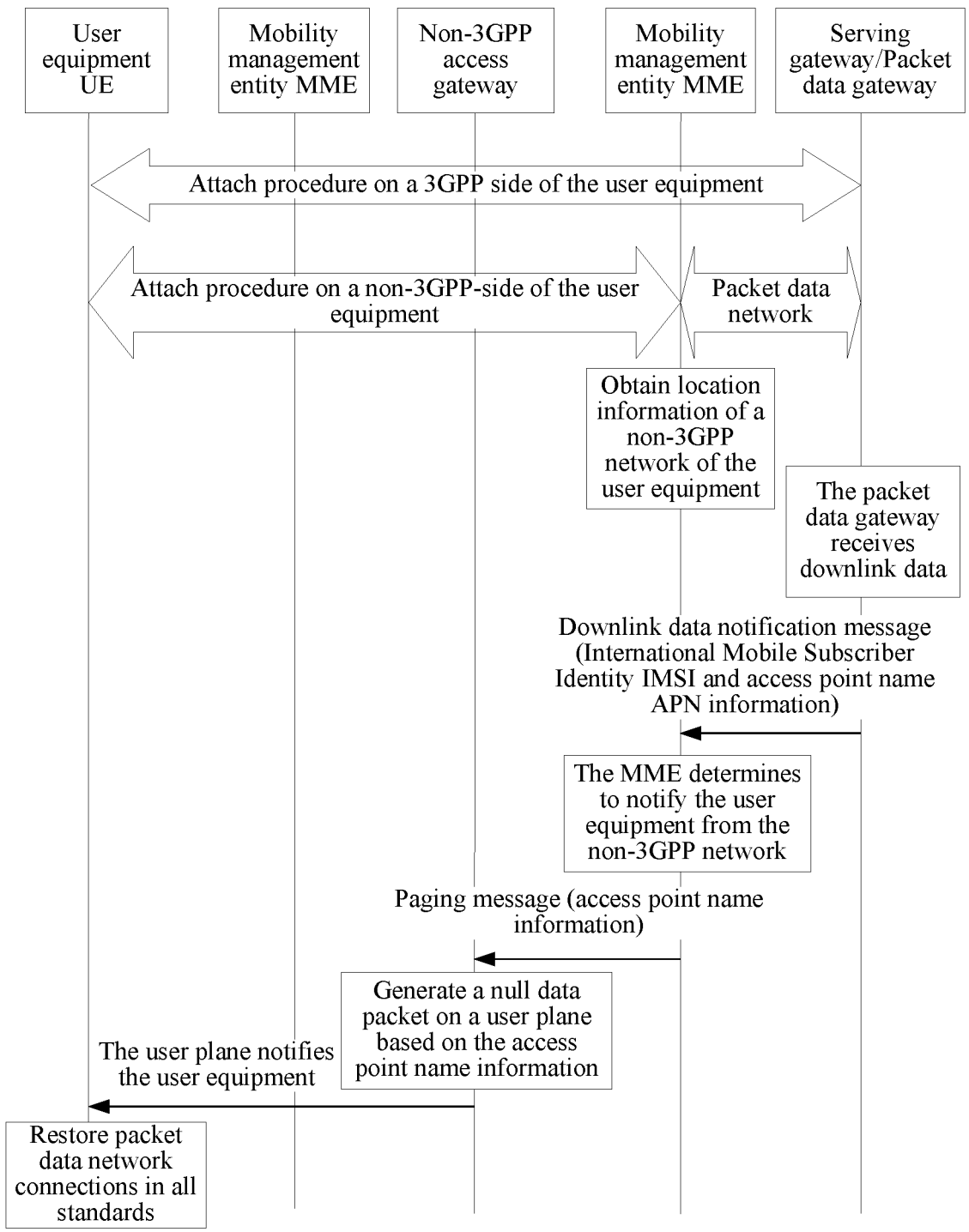
FIG. 5 is another schematic flowchart of UE restoring a connection to a 3GPP network according to an embodiment of the present invention.

In the sixth optional embodiment corresponding to FIG. 2, another solution of UE restoring a connection to the 3GPP network is provided. Specifically, referring to FIG. 5, FIG. 5 is another schematic flowchart of UE restoring a connection to the 3GPP network.

The UE completes the attach procedure on the 3GPP side and the attach procedure on the non-3GPP side. The PGW receives the downlink data packet, selects a suitable bearer tunnel according to a data flow in the data packet, and further sends the downlink data packet to the SGW. The SGW sends the downlink data notification message to the mobility management network element by using the PDN. The downlink data notification message may include an IMSI and the APN information.

When the mobility management network element determines that the UE accesses the non-3GPP network, the mobility management network element sends a paging message carrying the APN information to the non-3GPP access gateway. The non-3GPP access gateway generates a corresponding data packet on a user plane according to the APN information, and sends the data packet to the UE.

After receiving the data packet, the UE determines a corresponding PDN according to the data packet, and may restore connections in all standards under the PDN connection.

After triggering paging, the mobility management network element starts a paging timer. The paging timer is configured to calculate a paging time. If a service request message initiated by the UE is still not received after a paging time ends, the mobility management network element pages the UE again. The service request message is used to instruct the mobility management network element to send data to the UE by using a data connection channel. In the solution of paging the UE again, a paging message may be sent to all base stations in a location registration area of the UE. That is, a method in the prior art is used, or a corresponding paging manner in FIG. 2 in this embodiment of the present invention may be used. This is not limited here.

Optionally, based on the sixth optional embodiment corresponding to the foregoing FIG. 2, in a seventh optional embodiment of the paging method provided in this embodiment of the present invention, the sending, by the mobility management network element, an access identifier of the 3GPP network to the UE by using a non-3GPP access gateway may include:

sending, by the mobility management network element, the downlink data notification message carrying the APN information to a socket interface of the UE by using a socket socket interface of the non-3GPP access gateway.

In this embodiment, the mobility management network element sends the downlink data notification message carrying the APN information to the non-3GPP access gateway. Special socket interfaces are created for both the non-3GPP access gateway and the UE. The non-3GPP access gateway sends the paging message to the socket interface of the UE by using the socket interface, so that the UE forwards the paging message to a network-attached storage (NAS) module. The NAS module initiates a service request procedure of the UE and the 3GPP network side based on the received paging message, that is, triggers the UE to send a service request message to the mobility management network element.

Two programs in a network implement data exchange by using a bidirectional communication connection. One end of the connection is referred to as a socket interface. A connection process between two socket interfaces may include three steps: listening on the network side, requesting of UE, and connection acknowledgment. Specifically, in the present invention, that is, the socket interface of the non-3GPP access gateway on the network side does not locate the socket interface of the UE, but is in a state of waiting to be connected, so as to monitor a network state in real time. The socket interface of the UE provides a connection request, and a target that the socket interface of the UE needs to connect to is the socket interface of the non-3GPP access gateway on the network side. For this, the socket interface of the non-3GPP access gateway that the socket interface of the UE needs to connect to need to be described first for the socket interface of the UE. A socket address and a port number of the non-3GPP access gateway are pointed out, and the UE then sends a connection request to the non-3GPP access gateway. When the network side detects or receives a connection request, that is, the UE responds to the connection request of the UE and establishes a new thread, the UE may directly receive the downlink data notification message that is of the non-3GPP access gateway and that carries the APN information.

Further, in this embodiment of the present invention, socket interfaces are created on the UE and the non-3GPP access gateway. The mobility management network element directly sends, by using the socket interface of the non-3GPP access gateway, the downlink data notification message carrying the APN information to the socket interface of the UE, so that the UE restores a connection to the 3GPP network side. Therefore, this solution has diversity, and feasibility of the solution is enhanced.

Figure 6:
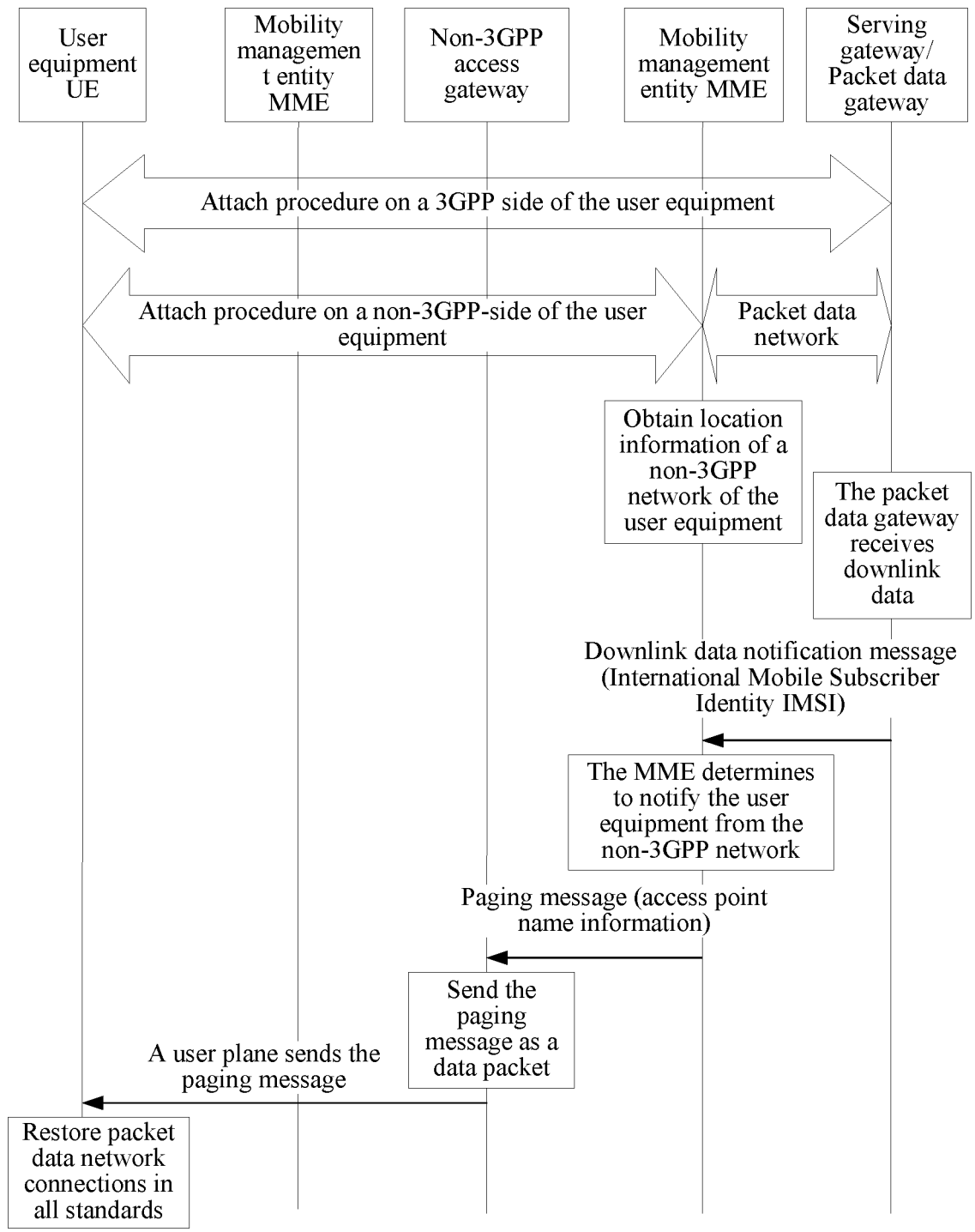
FIG. 6 is another schematic flowchart of UE restoring a connection to a 3GPP network according to an embodiment of the present invention.

In the sixth optional embodiment corresponding to FIG. 2, another solution of UE restoring a connection to the 3GPP network is provided. Specifically, referring to FIG. 6, FIG. 6 is another schematic flowchart of UE restoring a connection to the 3GPP network.

The UE completes the attach procedure on the 3GPP side and the attach procedure on the non-3GPP side. The PGW receives the downlink data packet, selects a suitable bearer tunnel according to a data flow in the data packet, and further sends the downlink data packet to the SGW. The SGW sends the downlink data notification message to the mobility management network element by using the PDN. The downlink data notification message may include an IMSI. The IMSI is the identifier of the UE, so as to determine specific information of the UE.

In addition, special socket interfaces are created on both the UE and the non-3GPP access gateway, so that a message may be directly transferred between the socket interfaces. When the mobility management network element determines that the UE accesses the non-3GPP network, the mobility management network element sends a paging message to the non-3GPP access gateway. The non-3GPP access gateway sends the paging message to the UE by using the socket interface of the UE in the form of a data packet. After receiving the paging message, the UE forwards the paging message to the NAS module in the UE. The NAS module determines, according to the paging message, that the UE initiates restoration of an air interface connection in a corresponding standard, so as to complete a communication connection to the 3GPP network.

After triggering paging, the mobility management network element starts a paging timer. The paging timer is configured to calculate a paging time. If a service request message initiated by the UE is still not received after a paging time ends, the mobility management network element pages the UE again. The service request message is used to instruct the mobility management network element to send data to the UE by using a data connection channel. In the solution of paging the UE again, a paging message may be sent to all base stations in a location registration area of the UE. That is, a method in the prior art is used, or a corresponding paging manner in FIG. 2 in this embodiment of the present invention may be used. This is not limited here.

Optionally, based on the foregoing FIG. 2 and the first to seventh corresponding embodiments corresponding to FIG. 2, in an eighth optional embodiment of the paging method provided in this embodiment of the present invention, the paging, by the mobility management network element, the UE according to the location information of the UE in the non-3GPP network may include:

sending, by the mobility management network element, a second paging message to a base station, where the second paging message carries the location information of the UE in the non-3GPP network, and the location information of the UE in the non-3GPP network is used by the base station to determine, according to the location information of the UE in the non-3GPP network, to send the first paging message to the UE.

In this embodiment, the mobility management network element sends the second paging message to a base station in the registration area of the UE. Different from the first paging message, the second paging message carries the location information of the UE in the non-3GPP network, so that the base station may determine, according to the location information of the UE in the non-3GPP network, to send the first paging message to the UE. The first paging message is a conventional paging message, and does not carry the location information of the UE in the non-3GPP network.

For the sending, by the mobility management network element, a second paging message to a base station in the registration area of the UE, the prior art may be used. One or more base stations are selected in the registration area of the UE as the target base station to send the second paging message. A correspondence between the location information of the UE in the non-3GPP network and a base station is configured on a base station side. The base station determines, according to the location information of the UE in the non-3GPP network, to send the first paging message to the UE.

Next, in this embodiment of the present invention, the relationship between a base station and the location information of the non-3GPP network may be configured. For this correspondence, refer to the description in the foregoing embodiment. A difference is that in the base station, only the relationship between a base station and the location information of the non-3GPP network may be configured. When it is determined that UE accesses by using the non-3GPP network, the mobility management network element sends the second paging message to the target base station. The location information of the non-3GPP network of target UE exists in the second paging message. The target base station determines, according to a configured relationship between the location of the target base station and the location information of the non-3GPP network of the target UE, whether to send the first paging message to the target UE. If the location information of the non-3GPP network of the UE represents that the UE is currently not in the paging range of the base station, the target base station does not need to send the first paging message to the UE, thereby improving the use efficiency of an air interface.

The foregoing FIG. 2 and the first to eighth embodiments corresponding to FIG. 2 are all described from the perspective of a mobility management network element. Embodiments of the present invention are described below from the perspective of a base station.

Figure 7:
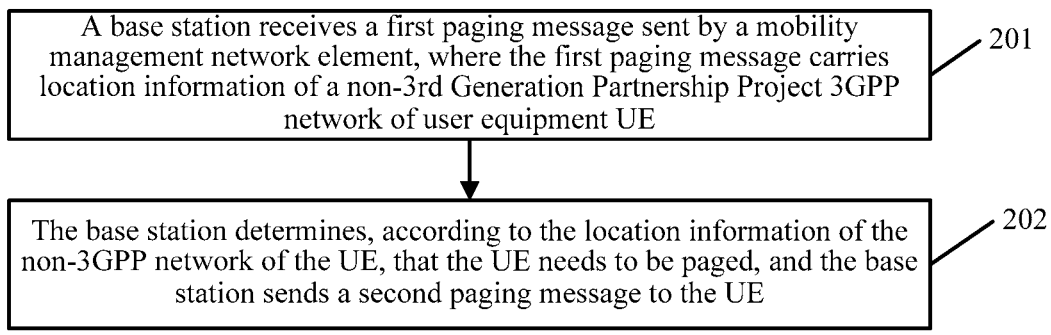
FIG. 7 is a schematic diagram of another embodiment of a paging method according to an embodiment of the present invention.

Referring to FIG. 7, FIG. 7 is a schematic flowchart of another paging method according to an embodiment of the present invention. The paging method may include the following steps.

201: Receive a first paging message sent by a mobility management network element, where the first paging message carries location information of user equipment UE in a non-3rd Generation Partnership Project 3GPP network.

In this embodiment, a base station receives the first paging message sent by the mobility management network element. The first paging message carries the location information of the UE in the non-3GPP network. A correspondence between the UE and the location information of the UE in the non-3GPP network may be configured on a base station side.

202. The base station determines, according to the location information of the UE in the non-3GPP network, that the UE needs to be paged, and the base station sends a second paging message to the UE.

In this embodiment, the base station receives the first paging message sent by the mobility management network element, and determines, according to the location of the non-3GPP network of the UE carried in the first paging message, whether to page the UE. The UE may determine, according to the location information of the UE in the non-3GPP network, a target base station corresponding to the UE. When determining to page the UE, the base station sends the second paging message to the UE. The second paging message does not carry the location information of the UE in the non-3GPP network.

In this embodiment of the present invention, a relationship between a base station and the location information of the UE in the non-3GPP network may be configured. When it is determined that target UE accesses by using the non-3GPP network, the mobility management network element sends the first paging message to the target base station. The location information of the non-3GPP network of the target UE exists in the first paging message. The UE may determine, according to the location information of the UE in the non-3GPP network, the target base station corresponding to the UE. The target base station determines, by using the location information of the UE in the non-3GPP network, whether to send the second paging message. If the location information of the UE in the non-3GPP network represents that UE is currently not in a paging range of the base station, a paging message does not need to be sent to the UE, thereby improving the use efficiency of an air interface.

Optionally, based on the embodiment corresponding to the foregoing FIG. 7, in a first optional embodiment of the paging method provided in this embodiment of the present invention, when the base station determines, according to the location information of the UE in the non-3GPP network, to page the UE, the sending, by the base station, a second paging message to the UE may include:

determining, by the base station, the paging range according to the location information of the UE in the non-3GPP network carried in the first paging message; and sending, by the base station, the second paging message in the paging range.

In this embodiment, the base station determines, according to the first paging message sent by the mobility management network element, whether paging needs to be performed. The location of the base station and the location information of the non-3GPP network may be preconfigured on the base station side. In this case, when the location information of the non-3GPP network of the target UE is obtained, it is determined whether the location information of the non-3GPP network of the target UE exists in the correspondence preconfigured by the target base station. If the location information of the non-3GPP network of the target UE exists in the correspondence, the target base station sends the second paging message to the target UE. If the location information of the non-3GPP network of the target UE does not exist in the correspondence configured on the base station side, the target base station does not page the target UE.

Next, in this embodiment of the present invention, a correspondence between a location of a base station and the location information of the non-3GPP network is configured on the base station side. When the target UE accesses the non-3GPP network, the location information of the non-3GPP network of the target UE is obtained, and it is determined whether the location information of the non-3GPP network of the target UE is in the correspondence preconfigured by the target base station. This correspondence may alternatively be understood as the paging range. The target base station can send the second paging message to the target UE in only the paging range. In this way, the paging range can be reduced, thereby improving use efficiency of an air interface.

The foregoing FIG. 7 is described from the perspective of a base station. Embodiments of the present invention are described below from the perspective of UE.

Figure 8:
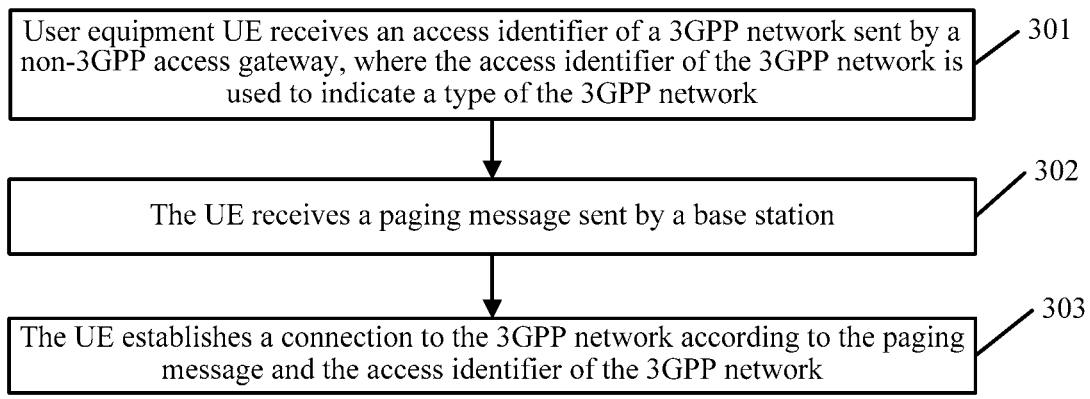
FIG. 8 is a schematic diagram of another embodiment of a paging method according to an embodiment of the present invention.

Referring to FIG. 8, FIG. 8 is a schematic flowchart of another paging method according to an embodiment of the present invention. The paging method may include the following steps.

301. User equipment UE receives an access identifier of a 3GPP network sent by a non-3GPP access gateway, where the access identifier of the 3GPP network is used to indicate a type of the 3GPP network.

In this embodiment, after receiving a downlink data notification, a mobility management network element may send the access identifier of the 3GPP network to the UE by using the non-3GPP access gateway, where the access identifier of the 3GPP network is used to indicate the type of the 3GPP network. The UE may be determine the type of the accessed 3GPP network according to the access identifier of the 3GPP network.

302: The UE receives a paging message sent by a base station.

In this embodiment, the UE receives the paging message sent by the base station. The base station may be a target base station determined by the mobility management network element according to location information of the UE in a non-3GPP network, or may be one or more base stations selected according to the prior art. The paging message received by the UE does not include the location information of the UE in the non-3GPP network.

303: The UE establishes a connection to the 3GPP network according to the paging message and the access identifier of the 3GPP network.

In this embodiment, the UE determines, according to the access identifier of the 3GPP network, the type of the 3GPP network that needs to be accessed, so as to receive the paging message in the 3GPP network and rapidly restore a connection to the 3GPP network.

In this embodiment of the present invention, the UE receives the access identifier of the 3GPP network sent by the non-3GPP access gateway and the paging message sent by the base station. The UE may establish a connection to the 3GPP network according to the paging message and the access identifier of the 3GPP network. In this way, the UE can rapidly and accurately connect to the 3GPP network, and perform paging based on the established connection to the 3GPP network.

Optionally, based on the embodiment corresponding to the foregoing FIG. 8, in a first optional embodiment of the paging method provided in this embodiment of the present invention, the receiving, by user equipment UE, an access identifier of the 3GPP network sent by a non-3GPP access gateway, where the access identifier of the 3GPP network is used to indicate a type of the 3GPP network may include:

receiving, by the UE, a radio access type RAT notified by the mobility management network element by using the non-3GPP access gateway, where the RAT is used to indicate the type of the 3GPP network; and determining, by the UE according to the RAT, the type as the type of the accessed 3GPP network.

In this embodiment, the access identifier of the 3GPP network may be the RAT. Specifically, after receiving the downlink data notification, the mobility management network element may send a message carrying the RAT type to the non-3GPP access gateway. The non-3GPP access gateway notifies the RAT to the UE again. After receiving the RAT sent by the mobility management network element, the UE determines, according to the RAT, the 3GPP network corresponding to an indication of the RAT.

It should be noted that, the mobility management network element sends the RAT to the non-3GPP access gateway in multiple manners. A downlink data notification may be used to carry the RAT, or a connection request between the mobility management network element and the non-3GPP access gateway may be used to carry the RAT, or the RAT may further be added to the paging message sent to the UE. Therefore, the manner of sending the RAT is not limited here.

The non-3GPP access gateway instructs the UE to restore the air interface connection indicated by the RAT. For an instruction manner, the non-3GPP access gateway may send downlink data carrying the RAT to the UE, or, another message transmitted between the non-3GPP access gateway and the UE carries the RAT.

Next, in this embodiment of the present invention, the mobility management network element instructs the UE on a control plane by using the non-3GPP access gateway to restore a connection to a 3GPP network side, to enable the UE to receive data by using the target network. The non-3GPP network is used to notify the UE that data is delivered from a 3GPP network side, and the UE establishes a connection to the target network according to the RAT. A paging connection between the UE and the 3GPP network can be precisely established according to an actual condition, so as not to occupy excessive network resources. Moreover, switching may be performed between different target networks, thereby increasing the feasibility and flexibility of the solution.

Optionally, based on the embodiment corresponding to the foregoing FIG. 8, in a second optional embodiment of the paging method provided in this embodiment of the present invention, the receiving, by user equipment UE, an access identifier of a 3GPP network sent by a non-3GPP access gateway, where the access identifier of the 3GPP network is used to indicate a type of the 3GPP network may include:

receiving, by the UE, access point name APN information sent by the mobility management network element by using the non-3GPP access gateway, where the APN information is used to indicate the type of the 3GPP network; and determining, by the UE according to the APN information, the type as the type of the accessed 3GPP network.

In this embodiment, after the mobility management network element receives the downlink data notification, the mobility management network element may send a message carrying the APN to a 3GPP access gateway. Specifically, a PGW receives a downlink data packet, and configures a corresponding flow template for flow information, thereby obtaining the APN information corresponding to the downlink data packet.

During actual application, the PGW may add the obtained APN information to a downlink data notification and send the downlink data notification to the mobility management network element, to enable the mobility management network element to obtain the APN information; or, the downlink data notification carries a TEID, and the TEID is used to indicate a connection between the mobility management network element and a PDN that downlink data belongs to, thereby determining the APN information corresponding to the PDN.

It should be noted that, the mobility management network element sends the APN information to the non-3GPP access gateway in multiple manners. A downlink data notification may be used to carry the APN information, or a connection request between the mobility management network element and the non-3GPP access gateway may be used to carry the APN information, or the APN information may further be added to the paging message sent to the UE. Therefore, the manner of sending the APN information is not limited here.

The non-3GPP access gateway sends a null packet or a special data packet on the PDN corresponding to the APN information according to the APN information, to notify the UE that data is about to be sent by using the PDN, so that the UE may determine the PDN from which a data packet is transmitted. After receiving the null packet or the special data packet, the UE restores corresponding connections of a PDN connection in all standards. For example, when the UE is in an idle state on the 3GPP network side, the UE receives, on a non-3GPP network side, a null packet or a special data packet sent on the PDN connection. If the PDN connection also supports access to the 3GPP network, the UE initiates restoration of an air interface connection on the 3GPP side, so as to determine the type of the accessed 3GPP network.

Next, in this embodiment of the present invention, the mobility management network element instructs, on a user plane by using the non-3GPP access gateway, the UE to restore a connection to a target network side, to enable the UE to receive data by using the target network. The non-3GPP network is used to notify the UE that data is delivered from the 3GPP network side. The UE determines, according to the APN information, the type of the accessed 3GPP network. In this way, the UE establishes an accurate data connection channel according to an actual condition, thereby saving network resources. Moreover, the efficiency of data transmission may be increased.

Optionally, based on the second optional embodiment corresponding to the foregoing FIG. 8, a third optional embodiment of the paging method provided in this embodiment of the present invention may further include:

establishing, by the UE, a socket socket interface.

The receiving, by the UE, access point name APN information sent by the mobility management network element by using the non-3GPP access gateway may include:

receiving, by the UE by using the socket interface, the access point name APN information sent by the non-3GPP access gateway by using the socket interface.

In this embodiment, the mobility management network element sends a paging message or downlink data notification message carrying the APN information to the non-3GPP access gateway. Special socket interfaces are created for both the non-3GPP access gateway and the UE. The non-3GPP access gateway sends the paging message carrying the APN information to the socket interface of the UE by using the socket interface. The UE forwards the paging message to a NAS module. The NAS module initiates a service request procedure of the UE and the 3GPP network side based on the received paging message, that is, triggers the UE to send a service request message to the mobility management network element.

It should be noted that, a data packet, a notification message or the like may further carry the APN information. The present invention is not only limited to that the paging message carries the APN information.

Two programs in a network implement data exchange by using a bidirectional communication connection. One end of the connection is referred to as a socket interface, or may be referred to as a socket interface. A connection process between two socket interfaces may include three steps: listening on a network side, requesting of UE, and connection acknowledgment. Specifically, in the present invention, that is, the socket interface of the non-3GPP access gateway on the network side does not locate the socket interface of the UE, but is in a state of waiting to be connected, so as to monitor a network state in real time. The socket interface of the UE provides a connection request, and a target that the socket interface of the UE needs to connect to is the socket interface of the non-3GPP access gateway on the network side. For this, the socket interface of the non-3GPP access gateway that the socket interface of the UE needs to connect to need to be described first for the socket interface of the UE. A socket address and a port number of the non-3GPP access gateway are pointed out, and the UE then sends a connection request to the non-3GPP access gateway. When the network side detects or receives a connection request, that is, the UE responds to the connection request of the UE and establishes a new thread, the UE may directly receive a paging message of the non-3GPP access gateway.

Next, in this embodiment of the present invention, socket interfaces are created on the UE and the non-3GPP access gateway, the mobility management network element directly sends the APN information to the socket interface of the UE by using the socket interface of the non-3GPP access gateway, so as to complete restoration of a connection to the 3GPP network side by the UE. Therefore, this solution has diversity, and feasibility of the solution is enhanced.

The foregoing FIG. 8 and the first to third embodiments corresponding to FIG. 8 are all described from the perspective of UE. Embodiments of the present invention are described below from the perspective of a non-3GPP access gateway.

Figure 9:
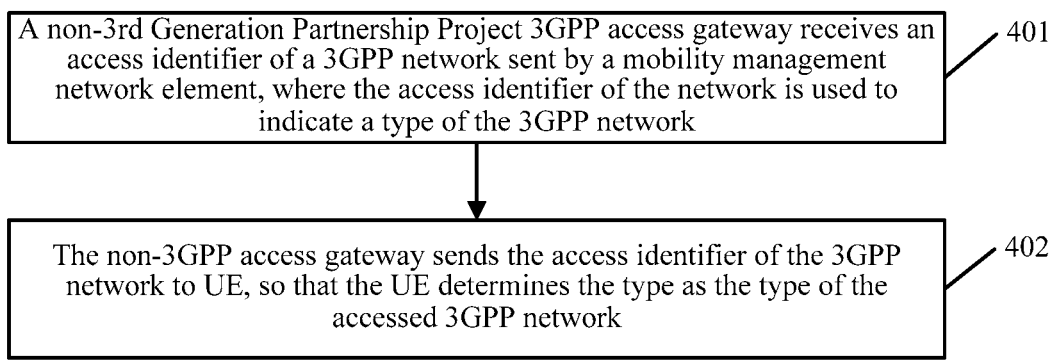
FIG. 9 is a schematic diagram of another embodiment of a paging method according to an embodiment of the present invention.

Referring to FIG. 9, FIG. 9 is a schematic flowchart of another paging method according to an embodiment of the present invention. The paging method may include the following steps.

401. A non-3rd Generation Partnership Project 3GPP access gateway receives an access identifier of a 3GPP network sent by a mobility management network element, where the access identifier of the network is used to indicate a type of the 3GPP network.

In this embodiment, after receiving the downlink data notification, the mobility management network element may send the access identifier of the 3GPP network to the non-3GPP access gateway. The access identifier of the network is used to indicate the type of the 3GPP network.

402. The non-3GPP access gateway sends the access identifier of the 3GPP network to UE, so that the UE determines the type as the type of the accessed 3GPP network.

In this embodiment, the non-3GPP access gateway sends the received access identifier of the 3GPP network to the UE. The UE may determine the type of the accessed 3GPP network according to the access identifier of the 3GPP network.

In this embodiment of the present invention, a manner in which the UE accesses the 3GPP network is described. The UE may receive the access identifier of the 3GPP network sent by the non-3GPP access gateway. The access identifier is used to determine a type corresponding to the 3GPP network. In this way, the UE can rapidly and accurately connect to the 3GPP network.

Optionally, based on the embodiment corresponding to the foregoing FIG. 9, in a first optional embodiment of the paging method provided in this embodiment of the present invention, the receiving, by a non-3rd Generation Partnership Project 3GPP access gateway, an access identifier of a 3GPP network sent by a mobility management network element may include:

receiving, by the non-3GPP access gateway, a radio access type RAT sent by the mobility management network element, where the RAT is used to indicate the type of the 3GPP network.

The sending, by the non-3GPP access gateway, the access identifier of the 3GPP network to the UE may include:

sending, by the non-3GPP access gateway, the RAT to the UE.

In this embodiment, after receiving the downlink data notification, the mobility management network element may send a message carrying RAT to the non-3GPP access gateway. The non-3GPP access gateway notifies the RAT to the UE again, so that after receiving the RAT, the UE initiates restoration of an air interface connection under a corresponding instruction, to complete a process of establishing a data connection channel to the 3GPP network. The RAT may be understood as one specific identifier of access identifiers of the 3GPP network.

It should be noted that, the mobility management network element sends the RAT to the non-3GPP access gateway in multiple manners. A downlink data notification may be used to carry the RAT, or a connection request between the mobility management network element and the non-3GPP access gateway may be used to carry the RAT, or the RAT may further be added to the paging message sent to the UE. Therefore, the manner of sending the RAT is not limited here.

The non-3GPP access gateway instructs the UE to restore the air interface connection indicated by the RAT. For an instruction manner, the non-3GPP access gateway may send downlink data carrying the RAT to the UE, or, another message transmitted between the non-3GPP access gateway and the UE carries the RAT.

Next, in this embodiment of the present invention, the mobility management network element instructs the UE on a control plane by using the non-3GPP access gateway to restore a connection to a 3GPP network side, to enable the UE to receive data by using the target network. A non-3GPP network is used to notify the UE that data is delivered from a 3GPP network side. The UE may precisely establish a paging connection to the 3GPP network according to an actual condition, so as not to occupy excessive network resources. Moreover, switching may be performed between different target networks, thereby increasing the feasibility and flexibility of the solution.

Optionally, based on the embodiment corresponding to the foregoing FIG. 9, in a second optional embodiment of the paging method provided in this embodiment of the present invention, the receiving, by a non-3rd Generation Partnership Project 3GPP access gateway, an access identifier of a 3GPP network sent by a mobility management network element may include:

receiving, by the non-3GPP access gateway, access point name APN information sent by the mobility management network element, where the APN information is used to indicate the type of the 3GPP network.

The sending, by the non-3GPP access gateway, an access identifier of the 3GPP network to the UE may include:

sending, by the non-3GPP access gateway, the APN information to the UE.

In this embodiment, after receiving the downlink data notification, the mobility management network element may send a message carrying the APN to a 3GPP access gateway. Specifically, a PGW receives a downlink data packet, and configures a corresponding flow template for flow information, thereby obtaining the APN information corresponding to the downlink data packet.

During actual application, the PGW may add the obtained APN information to a downlink data notification and send the downlink data notification to the mobility management network element, to enable the mobility management network element to obtain the APN information. Alternatively, the downlink data notification carries a TEID, and the TEID is used to indicate a connection between the mobility management network element and a PDN that downlink data belongs to, thereby determining the APN information corresponding to the PDN.

It should be noted that, the mobility management network element sends the APN information to the non-3GPP access gateway in multiple manners. A downlink data notification may be used to carry the APN information, or a connection request between the mobility management network element and the non-3GPP access gateway may be used to carry the APN information, or the APN information may further be added to the paging message sent to the UE. Therefore, the manner of sending the APN information is not limited here.

The non-3GPP access gateway sends a null packet or a special data packet on the PDN corresponding to the APN information according to the APN information, to notify the UE that data is about to be sent by using the PDN, so as to enable the UE to determine a specific PDN from which data is transmitted. After receiving the null packet or the special data packet, the UE restores corresponding connections of a PDN connection in all standards. For example, when the UE is in an idle state on the 3GPP network side, the UE receives, on a non-3GPP network side, a null packet or a special data packet sent on the PDN connection. If the PDN connection also supports access to the 3GPP network, the UE initiates restoration of an air interface connection on the 3GPP side, to complete a connection to the 3GPP network.

Next, in this embodiment of the present invention, the mobility management network element instructs, on a user plane by using the non-3GPP access gateway, the UE to restore a connection to a target network side, to enable the UE to receive data by using the target network. The non-3GPP network is used to notify the UE that data is delivered from the 3GPP network side, and the UE establishes a connection to the 3GPP network according to the APN information. In this way, the UE establishes an accurate data connection channel according to an actual condition, thereby saving network resources. Moreover, the efficiency of data transmission may be increased.

Optionally, based on the second optional embodiment corresponding to the foregoing FIG. 9, a third optional embodiment of the paging method provided in this embodiment of the present invention may further include:

establishing, by the non-3GPP access gateway, a socket socket interface.

The sending, by the non-3GPP access gateway, the APN information to the UE may include:

sending, by the non-3GPP access gateway, the APN information to the socket interface of the UE by using the socket interface, where the APN information is used to indicate the type of the 3GPP network, so that the UE determines the type as the type of the accessed 3GPP network.

In this embodiment, the mobility management network element sends a paging message to the non-3GPP access gateway. Special socket interfaces are created for both the non-3GPP access gateway and the UE. The non-3GPP access gateway sends the paging message to the socket interface of the UE by using the socket interface, so that the UE forwards the paging message to a NAS module. The NAS module initiates a service request procedure of the UE and the 3GPP network side based on the received paging message, that is, triggers the UE to send a service request message to the mobility management network element.

Next, in this embodiment of the present invention, the socket interfaces are created on the UE and the non-3GPP access gateway, the mobility management network element directly sends the paging message to the socket interface of the UE by using the socket interface of the non-3GPP access gateway, so as to complete restoration of a connection to the 3GPP network side by the UE. Therefore, this solution has diversity, and feasibility of the solution is enhanced.

In the foregoing embodiments, the description of each embodiment has respective focuses. For a part that is not described in detail in an embodiment, refer to related descriptions in other embodiments.

Figure 10:
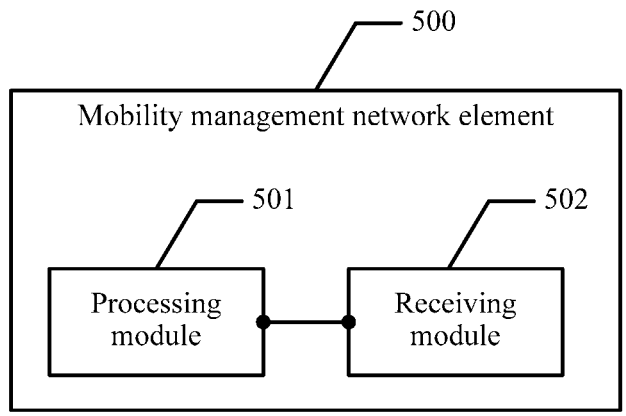
FIG. 10 is a schematic diagram of an embodiment of a mobility management network element according to an embodiment of the present invention.

A mobility management network element in the present invention is described below in detail. Referring to FIG. 10, a mobility management network element 500 in this embodiment of the present invention includes:

a processing module 501, configured to obtain location information of user equipment UE in a non-3rd Generation Partnership Project 3GPP network, where the UE is UE that already accesses the non-3GPP network; and a receiving module 502, configured to receive a downlink data notification message, where the downlink data notification message carries an identifier of the UE.

The processing module 501 is further configured to page the UE according to the location information of the UE in the non-3GPP network.

In this embodiment, a processing module 501 obtains the location information of the non-3rd Generation Partnership Project 3GPP network of the user equipment UE, where the UE is UE that already accesses the non-3GPP network. The receiving module 502 receives the downlink data notification message, where the downlink data notification message carries the identifier of the UE. The processing module 501 further pages the UE according to the location information of the UE in the non-3GPP network.

In this embodiment of the present invention, the mobility management network element obtains the location information of the UE in the non-3GPP network, and when paging the UE in a 3GPP network, may determine a paging range according to the location information of the UE in the non-3GPP network but does not need to send a paging message to all base stations in a registration area of the UE, so that paging signaling is effectively reduced, and air interface resources are saved.

Figure 11:
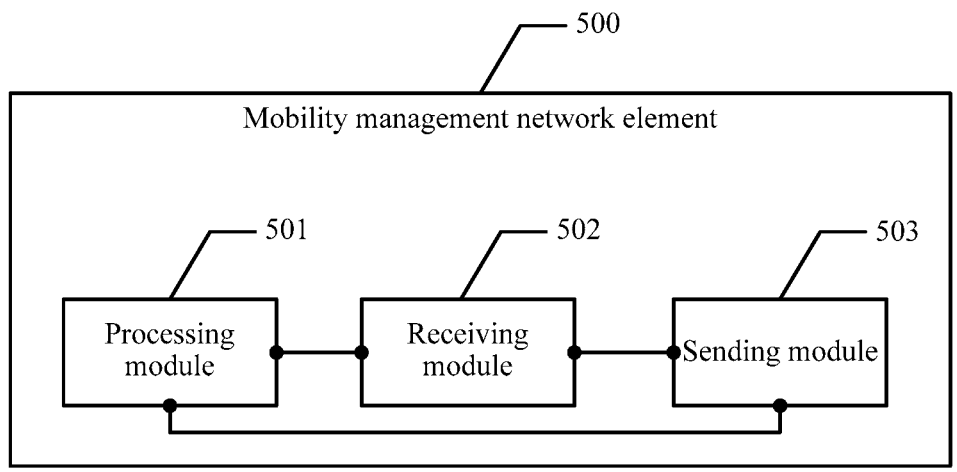
FIG. 11 is a schematic diagram of another embodiment of a mobility management network element according to an embodiment of the present invention.

Optionally, based on the embodiment corresponding to the foregoing FIG. 10, referring to FIG. 11, in another embodiment of the mobility management network element according to this embodiment of the present invention, the mobility management network element 50 further includes a sending module 503.

The processing module 501 is specifically configured to: determine a target base station according to the location information of the UE in the non-3GPP network, and control the sending module 503 to send a first paging message to the target base station.

Next, in this embodiment of the present invention, a relationship between a base station and location information of the non-3GPP network may be configured on the mobility management network element. The mobility management network element determines the target base station according to the location information of the UE in the non-3GPP network. The target base station may send the first paging message to the UE by using the prior art. In this way, the paging message may not need to be sent to all base stations in the registration area of the UE. Generally, there is only one target base station. In this way, a quantity of selected base stations is greatly reduced, thereby further reducing paging signaling, and air interface resources are saved.

Optionally, based on the embodiment corresponding to the foregoing FIG. 11, in another embodiment of the mobility management network element according to this embodiment of the present invention, the processing module 501 is specifically configured to determine the target base station according to a correspondence between the target base station and the location information of the UE in the non-3GPP network.

Next, in this embodiment of the present invention, a correspondence between a location of a base station and location information of the non-3GPP network may be configured on the mobility management network element. After the location information of the UE in the non-3GPP network is obtained, and the target base station is selected by the mobility management network element according to the correspondence, thereby improving feasibility and operability of a solution during actual application.

Optionally, based on the embodiment corresponding to the foregoing FIG. 11, in another embodiment of the mobility management network element according to this embodiment of the present invention, The processing module 501 is specifically configured to: determine location information of the UE in the 3GPP network according to the location information of the UE in the non-3GPP network, and determine the target base station according to a correspondence between a base station and the location information of the UE in the 3GPP network.

Next, in this embodiment of the present invention, the location information of the 3GPP network is determined by using the location information of the UE in the non-3GPP network, and the location information of the UE in the 3GPP network may be located more precisely. In an existing solution, when the 3GPP network is used to page UE in an idle state, the obtained paging range is relatively large, and multiple location areas may be included. Each location area is formed of multiple cells. Therefore, in this embodiment, the location information of the UE in the 3GPP network is used to determine the paging range, so that the paging range can further be reduced, thereby reducing sending of paging messages, so as to save air interface resources.

Optionally, based on the embodiment corresponding to the foregoing FIG. 10 or FIG. 11, in another embodiment of the mobility management network element according to this embodiment of the present invention, the sending module 503 is further configured to: after the receiving module 502 receives the downlink data notification message, send an access identifier of the 3GPP network to the UE by using a non-3GPP access gateway, where the access identifier of the 3GPP network is used to indicate a type of the accessed 3GPP network to the UE.

Next, in this embodiment of the present invention, a manner in which the UE accesses the 3GPP network is described. The UE may receive the access identifier of the 3GPP network sent by a network side, and determine, by using the access identifier of the 3GPP network, to receive paging in the corresponding 3GPP network. In this way, the UE can rapidly and accurately connect to the 3GPP network.

Optionally, based on the embodiment corresponding to the foregoing FIG. 10 or FIG. 11, in another embodiment of the mobility management network element according to this embodiment of the present invention, the access identifier of the 3GPP network includes a radio access technology RAT type.

Further, in this embodiment of the present invention, the mobility management network element instructs the UE on a control plane by using the non-3GPP access gateway to restore a connection to a 3GPP network side, to enable the UE to receive data by using the target network. The non-3GPP network is used to notify the UE that data is delivered from a 3GPP network side, and the UE establishes a connection to the target network according to the RAT. A paging connection between the UE and the 3GPP network can be precisely established according to an actual condition, so as not to occupy excessive network resources. Moreover, switching may be performed between different target networks, thereby increasing the feasibility and flexibility of the solution.

Optionally, based on the embodiment corresponding to the foregoing FIG. 10 or FIG. 11, in another embodiment of the mobility management network element according to this embodiment of the present invention, the access identifier of the 3GPP network is access point name APN information.

Further, in this embodiment of the present invention, the mobility management network element instructs the UE on a user plane by using the non-3GPP access gateway to restore a connection to a 3GPP network side, to enable the UE to receive data by using the 3GPP network. The non-3GPP network is used to notify the UE that data is delivered from a 3GPP network side, and the UE establishes a connection to the 3GPP network according to the APN information. In this way, the UE establishes an accurate data connection channel according to an actual condition, thereby saving network resources. Moreover, the efficiency of data transmission may be increased.

Optionally, based on the embodiment corresponding to the foregoing FIG. 10 or FIG. 11, in another embodiment of the mobility management network element according to this embodiment of the present invention, the sending, by the sending module 503, an access identifier of the 3GPP network to the UE by using a non-3GPP access gateway includes: sending, by the sending module 503, the downlink data notification message carrying the APN information to a socket interface of the UE by using a socket socket interface of the non-3GPP access gateway.

Further, in this embodiment of the present invention, the socket interfaces are created on the UE and the non-3GPP access gateway, the mobility management network element directly sends the downlink data notification message carrying the APN information to the socket interface of the UE by using the socket interface of the non-3GPP access gateway, so as to complete restoration of a connection to the 3GPP network side by the UE. Therefore, this solution has diversity, and feasibility of the solution is enhanced.

Optionally, based on the embodiment corresponding to the foregoing FIG. 10 or FIG. 11, in another embodiment of the mobility management network element according to this embodiment of the present invention, the mobility management network element further includes a sending module 503, where the sending module 503 is specifically configured to send a second paging message to a base station, where the second paging message carries the location information of the UE in the non-3GPP network, and the location information of the UE in the non-3GPP network is used by the base station to determine, according to the location information of the UE in the non-3GPP network, to send the first paging message to the UE.

Next, in this embodiment of the present invention, a relationship between a base station and location information of the non-3GPP network may be configured. For this correspondence, refer to the description in the foregoing embodiment. A difference is that only the relationship between a base station and the location information of the non-3GPP network may be configured in the base station. When it is determined that the UE accesses by using the non-3GPP network, the mobility management network element sends the second paging message to the target base station. The location information of the non-3GPP network of target UE exists in the second paging message. The target base station determines, according to a configured relationship between the location of the target base station and the location information of the non-3GPP network of the target UE, whether to send the first paging message to the target UE. If the location information of the UE in the non-3GPP network represents that the UE is currently not in the paging range of the base station, the first paging message does not need to be sent to the UE, thereby improving the use efficiency of an air interface.

The foregoing embodiments are all described from the perspective of a mobility management network element. The embodiments of the present invention are described below from the perspective of a base station.

Figure 12:
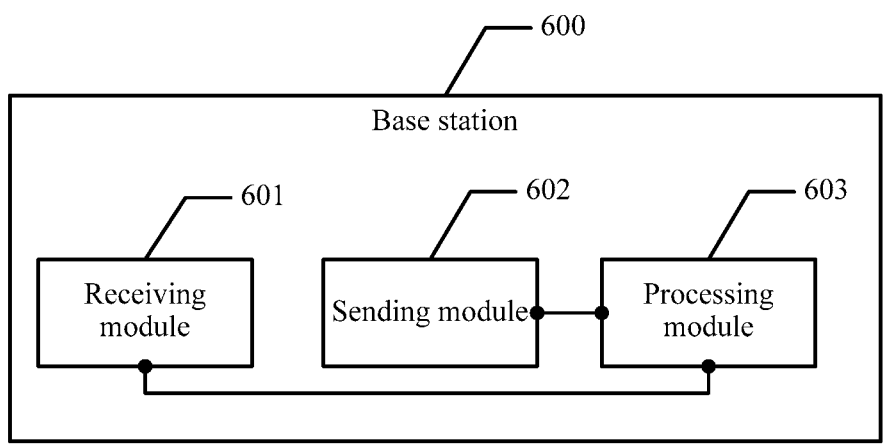
FIG. 12 is a schematic diagram of an embodiment of a base station according to an embodiment of the present invention.

A base station in the present invention is described below in detail. Referring to FIG. 12, a base station 600 in this embodiment of the present invention includes:

a receiving module 601, configured to receive a first paging message sent by a mobility management network element, where the first paging message carries location information of user equipment UE in a non-3rd Generation Partnership Project 3GPP network;

a sending module 602, configured to send a second paging message to the UE; and a processing module 603, configured to: after the receiving module 601 receives the first paging message, determine, according to the location information of the UE in the non-3GPP network, to page the UE, and control the sending module 602 to send the second paging message to the UE.

In this embodiment, the receiving module 601 receives the first paging message sent by the mobility management network element, where the first paging message carries the location information of the non-3rd Generation Partnership Project 3GPP network of the user equipment UE. After the receiving module 601 receives the first paging message, when the processing module 603 determines, according to the location information of the UE in the non-3GPP network, to page the UE, the sending module 602 is controlled to send the second paging message to the UE. The sending module 602 is configured to send the second paging message to the UE.

In this embodiment of the present invention, a relationship between a base station and the location information of the UE in the non-3GPP network may be configured. When it is determined that target UE accesses by using the non-3GPP network, the mobility management network element sends the first paging message to a target base station. The location information of the non-3GPP network of the target UE exists in the first paging message. The UE may determine, according to the location information of the UE in the non-3GPP network, the target base station corresponding to the UE. The target base station determines, by using the location information of the UE in the non-3GPP network, whether to send the second paging message. If the location information of the UE in the non-3GPP network represents that the UE is currently not in a paging range of the base station, a paging message does not need to be sent to the UE, thereby improving the use efficiency of an air interface.

Optionally, based on the embodiment corresponding to the foregoing FIG. 12, in another embodiment of the base station provided in this embodiment of the present invention, the processing module 603 is specifically configured to: determine the paging range according to the location information of the UE in the non-3GPP network carried in the first paging message received by the receiving module 601, and control the sending module 602 to send the second paging message to the UE in the paging range.

Next, in this embodiment of the present invention, a correspondence between a location of a base station and the location information of the non-3GPP network is configured on a base station side. When the target UE accesses the non-3GPP network, the location information of the non-3GPP network of the target UE is obtained, and it is determined whether the location information of the non-3GPP network of the target UE is in the correspondence preconfigured by the target base station. This correspondence may alternatively be understood as the paging range. The target base station can send the second paging message to the target UE in only the paging range. In this way, the paging range can be reduced, thereby improving use efficiency of an air interface.

Figure 13:
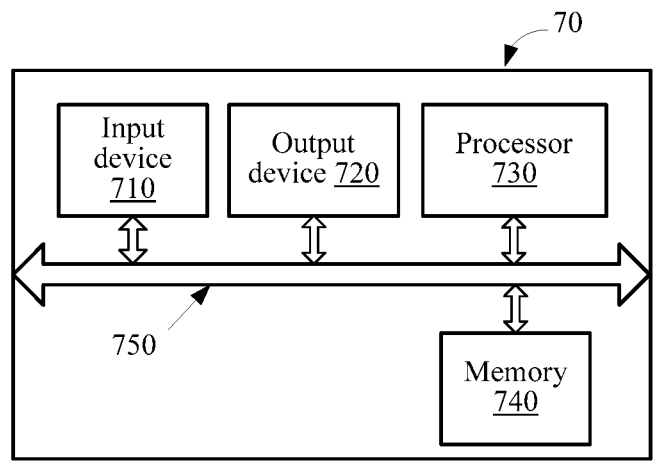
FIG. 13 is a schematic structural diagram of a paged mobility management network element according to this embodiment.

FIG. 13 is a schematic structural diagram of a mobility management network element 70 according to an embodiments of the present invention. The mobility management network element 70 may include an input device 710, an output device 720, a processor 730, and a memory 740. The output device in this embodiment of the present invention may be a display device.

The memory 740 may include a read-only memory and a random-access memory, and provide an instruction and data to the processor 730. A part of the memory 740 may further include a non-volatile random-access memory (NVRAM).

The memory 740 stores the following elements: executable modules, or data structures, or a subset thereof, or an extended set thereof;

operation instructions, including various operation instructions, and used to implement various operations; and an operating system, including various system programs, and used to implement various fundamental services and process hardware-based tasks.

In this embodiment of the present invention, the processor 730 is configured to:

obtain location information of user equipment UE in a non-3rd Generation Partnership Project 3GPP network, where the UE is UE that already accesses the non-3GPP network; and page the UE according to the location information of the UE in the non-3GPP network.

Optionally, the processor 730 is specifically configured to:
determine a target base station according to the location information of the UE in the non-3GPP network, and send a first paging message to the UE by using the target base station.

Optionally, the processor 730 is specifically configured to:
determine the target base station according to a correspondence between the target base station and the location information of the UE in the non-3GPP network;
determine location information of the UE in a 3GPP network according to the location information of the UE in the non-3GPP network; and
determine the target base station according to a preconfigured correspondence between a base station and the location information of the UE in the 3GPP network.

Optionally, the processor 730 is specifically configured to:

obtain access point name APN information from the downlink notification message.

In this embodiment of the present invention, the input device 710 is configured to:

receive a downlink data notification message, where the downlink data notification message carries an identifier of the UE.

In this embodiment of the present invention, the output device 720 is configured to:

send an access identifier of the 3GPP network to the UE by using a non-3GPP access gateway, where the access identifier of the 3GPP network is used to indicate a type of the 3GPP network, to enable the UE to determine the type as the type of the accessed 3GPP network.

Optionally, the output device 720 is specifically configured to:

notify the UE of a radio access type RAT by using the non-3GPP access gateway, where the RAT is used to indicate the type of the 3GPP network, to enable the UE to determine the type as the type of the accessed 3GPP network.

Optionally, the output device 720 is specifically configured to:

send the downlink data notification message carrying the APN information to the UE by using the non-3GPP access gateway, where the APN information is used to indicate the type of the 3GPP network, to enable the UE to determine the type as the type of the accessed 3GPP network.

Optionally, the output device 720 is specifically configured to:

send the downlink data notification message carrying the APN information to a socket interface of the UE by using a socket socket interface of the non-3GPP access gateway.

Optionally, the output device 720 is specifically configured to:

send a second paging message to a base station, where the second paging message carries the location information of the UE in the non-3GPP network, so that the UE determines the target base station according to the location information of the UE in the non-3GPP network, and send the first paging message to the UE by using the target base station.

The processor 730 controls an operation of the mobility management network element 70. The processor 730 may further be referred to as a central processing unit (CPU). The memory 740 may include a read-only memory and a random-access memory, and provide an instruction and data to the processor 730. A part of the memory 740 may further include an NVRAM. During specific application, the components of the mobility management network element 70 are coupled together by using a bus system 950. The bus system 950 may further include, in addition to a data bus, a power supply bus, a control bus, a status signal bus, and the like. However, for clear description, various types of buses in the figure are marked as the bus system 750.

The methods disclosed in the foregoing embodiments of the present invention may be applied to the processor 730, or are implemented by the processor 730. The processor 730 may be an integrated circuit chip and have a signal processing capability. During implementation, each step of the foregoing method may be implemented by a hardware integrated logical circuit in the processor 730 or by an instruction in a software form. The processor 730 may be a general purpose processor, a digital signal processor (DSP), an application-specific integrated circuit (ASIC), a field-programmable gate array (FPGA), or another programmable logic device, discrete gate or transistor logic device, or discrete hardware component. The processor may implement or perform the methods, the steps, and logical block diagrams that are disclosed in the embodiments of the present invention. The general-purpose processor may be a microprocessor, or the processor may further be any conventional processor, or the like. Steps of the methods disclosed with reference to the embodiments of the present invention may be directly performed and completed by using a hardware decoding processor, or may be performed and completed by using a combination of hardware and software modules in the decoding processor. The software module may be located in a mature storage medium in the field, such as a random-access memory, a flash memory, a read-only memory, a programmable read-only memory, an electrically-erasable programmable memory, or a register. The storage medium is located in the memory 740, and the processor 730 reads information in the memory 740 and completes the steps in the foregoing methods in combination with hardware of the processor.

Refer to the related description in the method part in FIG. 2 and effects for understanding of related description of FIG. 13, which is no longer elaborated here.

Figure 14:
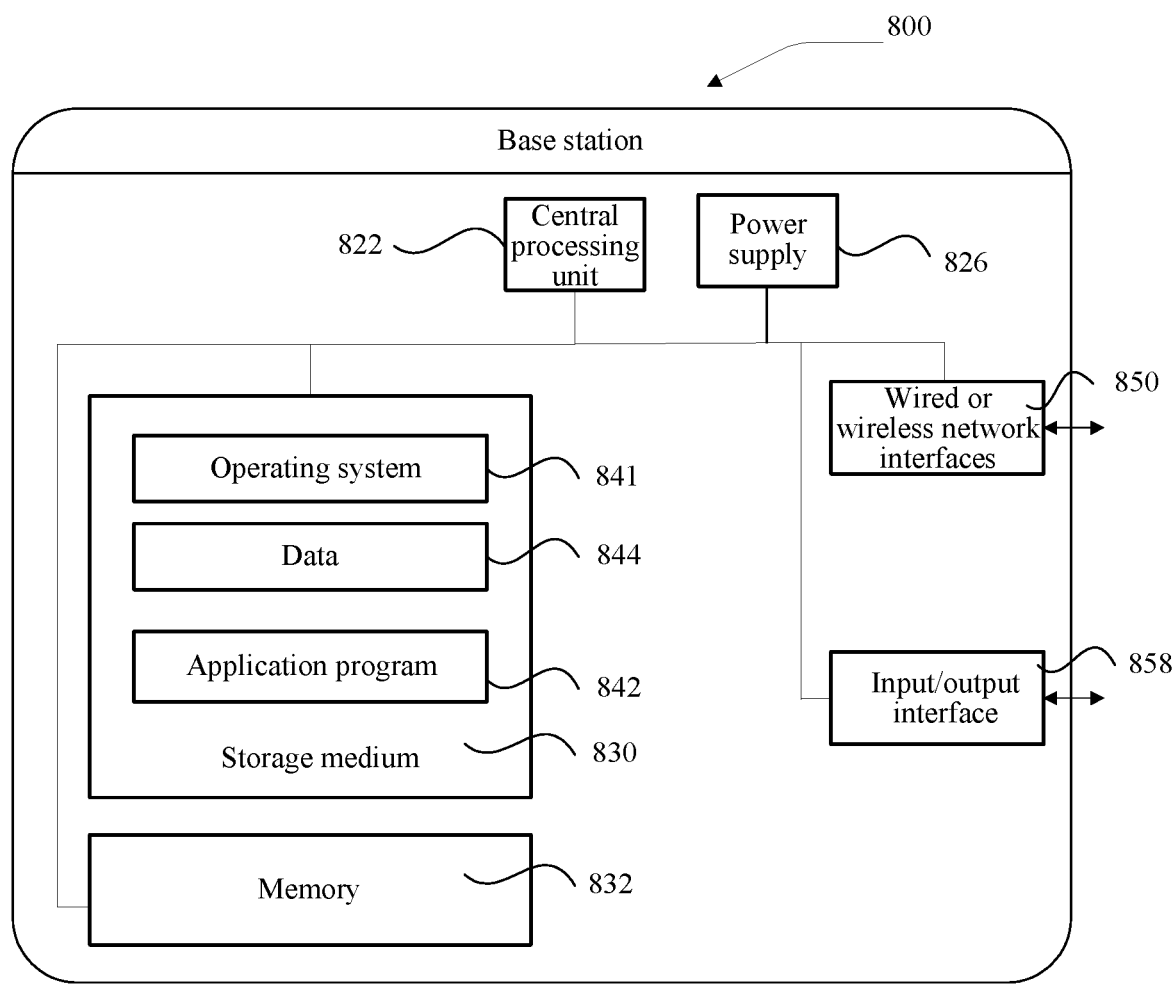
FIG. 14 is a schematic structural diagram of a paged base station according to this embodiment.

FIG. 14 is a schematic structural diagram of a base station according to an embodiment of the present invention. A base station 800 may have a relatively large difference because of configuration or performance differences, and may include one or more CPUs 822 (for example, one or more processors), a memory 832, and one or more storage media 830 storing an application program 842 or data 844 (for example, one or more massive storage devices). The memory 832 and the storage medium 830 may be transient storages or persistent storages. A program stored in the storage medium 830 may include one or more modules (not shown in the figure), and each module may include a series of instruction operations in the server. Further, the central processing unit 822 may be configured to communicate with the storage medium 830, and executes a series of instruction operations in the storage medium 830 on the base station 800.

The base station 800 may further include one or more power supplies 826, one or more wired or wireless network interfaces 850, one or more input/output interfaces 858, and/or, one or more operating systems 841, for example, a Windows Server™, a Mac OS X™, Unix™, Linux™, and FreeBSD™.

The steps performed by a base station in the foregoing embodiment may be based on the structure of the base station shown by 800 in FIG. 14.

The input/output apparatus 858 may be configured to:

receive a first paging message sent by a mobility management network element, where the first paging message carries location information of user equipment UE in a non-3rd Generation Partnership Project 3GPP network; and when the base station determines, according to the location information of the UE in the non-3GPP network, to page the UE, send a second paging message to the UE.

Optionally, the input/output apparatus 858 may further be specifically configured to:

send the second paging message to the UE in a paging range.

The central processing unit 822 may be configured to:

determine the paging range according to the location information of the UE in the non-3GPP network carried in the first paging message.

Figure 15:
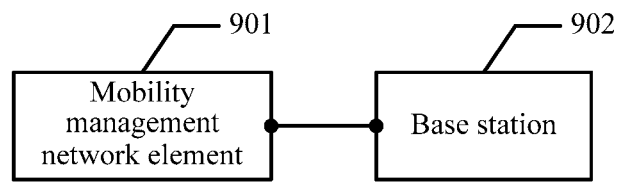
FIG. 15 is a schematic diagram of an embodiment of a paging system according to this embodiment.

Referring to FIG. 15, an embodiment of the present invention further provides a paging system, including: a mobility management network element 901 and a base station 902.

The mobility management network element 901 is configured to: obtain location information of user equipment UE in a non-3rd Generation Partnership Project 3GPP network, where the UE is UE that already accesses the non-3GPP network; receive a downlink data notification message, where the downlink data notification message carries an identifier of the UE; and page the UE according to the location information of the UE in the non-3GPP network.

The base station 902 is configured to: receive a first paging message sent by the mobility management network element 901, where the first paging message carries the location information of the non-3rd Generation Partnership Project 3GPP network of the user equipment UE; and determine according to the location information of the UE in the non-3GPP network, that the UE needs to be paged, and send a second paging message to the UE.

In this embodiment of the present invention, the mobility management network element obtains the location information of the UE in the non-3GPP network, and when paging the UE in the 3GPP network, may determine a paging range according to the location information of the UE in the non-3GPP network but does not need to send a paging message to all base stations in a registration area of the UE, so that paging signaling is effectively reduced, and air interface resources are saved.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random-access memory (RAM), a magnetic disk, or an optical disc.

The paging method provided in the present invention is described in detail above. The principle and implementation of the present invention are described herein through specific examples. The description about the embodiments of the present invention is merely provided to help understand the method and core ideas of the embodiments of the present invention. In addition, a person skilled in the art can make variations and modifications to the present invention in terms of the specific implementations and application scopes according to the ideas of the present invention. Therefore, the content of specification shall not be construed as a limit to the present invention.

What is claimed is:

1. A paging method, comprising:
   obtaining, by a mobility management network element, location information of user equipment (UE) in a non-3rd Generation Partnership Project (3GPP) network;
   determining, by the mobility management network element, that the UE has accessed the non-3GPP network and should be notified over the non-3GPP network to establish a connection with a 3GPP network according to the location information of the UE in the non-3GPP network, wherein an attach procedure on the 3GPP network and an attach procedure on the non-3GPP network have been completed by the UE, and the UE is in an idle state on the 3GPP network;
   sending, by the mobility management network element, a notification message including an access identifier of the 3GPP network to the UE by using a non-3GPP network access gateway; and
   sending, by the mobility management network element, a first paging message to a base station in the 3GPP network, wherein the first paging message includes the location information of the UE in the non-3GPP network for the base station to determine whether to send a second paging message to the UE, and the second paging message does not include the location information of the UE in the non-3GPP network to the UE.

2. The method according to claim 1, wherein the access identifier of the 3GPP network is used to indicate a type of an accessed 3GPP network to the UE.

3. The method according to claim 1, wherein the access identifier of the 3GPP network comprises a radio access technology (RAT) type.

4. The method according to claim 1, the method comprising:
   receiving, by the mobility management network element, a downlink data notification message including an identifier of the UE.

5. The method according to claim 1, the method comprising:
   paging, by the mobility management network element, the UE in response to determining that a service request message from the UE is not received before a paging time ends, wherein the paging time is calculated by a paging timer, and the paging timer starts after triggering the paging method.

6. The method according to claim 5, wherein the paging, by the mobility management network element, the UE again comprises:
   sending, by the mobility management network element, a paging message, to all base stations in a location registration area of the UE.

7. The method according to claim 1, the method comprising:
receiving, by the mobility management network element, a service request message from the UE in response to the notification message.

8. An apparatus in a mobility management network element for executing a paging method, comprising:
at least one processor; and
a non-transitory computer-readable storage medium coupled to the at least one processor and storing programming instructions for execution by the at least one processor, the programming instructions instruct the at least one processor to:
obtaining, by a mobility management network element, location information of user equipment (UE) in a non-3rd Generation Partnership Project (3GPP) network;
determine that the UE has accessed the non-3GPP network and should be notified over the non-3GPP network to establish a connection with a 3GPP network according to the location information of the UE in the non-3GPP network, wherein an attach procedure on the 3GPP network and an attach procedure on the non-3GPP network have been completed by the UE, and the UE is in an idle state on the 3GPP network;
send a notification message including an access identifier of the 3GPP network to the UE by using a non-3GPP network access gateway; and
send a first paging message to a base station in the 3GPP network, wherein the first paging message includes the location information of the UE in the non-3GPP network for the base station to determine whether to send a second paging message to the UE, and the second paging message does not include the location information of the UE in the non-3GPP network to the UE.

9. The apparatus according to claim 8, wherein the access identifier of the 3GPP network indicates a type of an accessed 3GPP network to the UE.

10. The apparatus according to claim 8, wherein the access identifier of the 3GPP network comprises a radio access technology (RAT) type.

11. The apparatus according to claim 8, wherein the programming instructions instruct the at least one processor to:
receive a downlink data notification message including an identifier of the UE.

12. The apparatus according to claim 8, wherein the programming instructions instruct the at least one processor to:
page the UE in response to determining that the service request message from the UE is not received before a paging time ends, wherein the paging time is calculated by a paging timer, and the paging timer starts after triggering the paging method.

13. The apparatus according to claim 12, wherein the programming instructions instruct the at least one processor to:
send a paging message to all base stations in a location registration area of the UE.

14. The apparatus according to claim 8, wherein the programming instructions instruct the at least one processor to:
receive a service request message from the UE in response to the notification message.

* * * * *